(12) United States Patent
Riegel et al.

(10) Patent No.: US 10,180,566 B2
(45) Date of Patent: Jan. 15, 2019

(54) OPERATING STATE DEPENDENT APPEARANCE OF A LIGHTING DEVICE AND A METHOD THEREFORE UTILIZING MICROFLUIDS AND PUMP

(71) Applicant: OSRAM OLED GmbH, Regensburg (DE)

(72) Inventors: Nina Riegel, Tegernheim (DE);
Thomas Wehlus, Lappersdorf (DE);
Dominik Pentlehner, Regensburg (DE)

(73) Assignee: OSRAM OLED GMBH, Regensburg (DE)

( * ) Notice: Subject to any disclaimer, the term of this patent is extended or adjusted under 35 U.S.C. 154(b) by 141 days.

(21) Appl. No.: 15/071,288

(22) Filed: Mar. 16, 2016

(65) Prior Publication Data
US 2016/0274351 A1    Sep. 22, 2016

(30) Foreign Application Priority Data
Mar. 16, 2015    (DE) .......................... 10 2015 103 794

(51) Int. Cl.
*G02B 26/00* (2006.01)
*F21V 9/12* (2006.01)
(Continued)

(52) U.S. Cl.
CPC .............. *G02B 26/004* (2013.01); *F21V 5/00* (2013.01); *F21V 9/12* (2013.01); *F21V 14/00* (2013.01);
(Continued)

(58) Field of Classification Search
CPC .......... G02B 26/004; G02B 5/24; G02B 1/06; G02B 6/3538; F21V 9/12; F21S 10/002
(Continued)

(56) References Cited

U.S. PATENT DOCUMENTS 5,952,778 A  *  9/1999  Haskal ................ H01L 51/5256
                                                        313/504
7,210,809 B2     5/2007  Blackstock
(Continued)

FOREIGN PATENT DOCUMENTS

CN       106369547 A  *  2/2017
DE          1772158 A1      1/1971
(Continued)

OTHER PUBLICATIONS

Chen, BYang, Intra-cavity lens device and illumination and/or signal indication equipment, Feb. 1, 2017, Patent Pub CN106369547A; Google Patents, https://patents.google.com/patent/CN106369547A/en.*
(Continued)

*Primary Examiner* — Anh Mai
*Assistant Examiner* — Michael Chiang
(74) *Attorney, Agent, or Firm* — Viering, Jentschura & Partner mbB

(57) ABSTRACT

A lighting device includes a carrier, in which a laterally extended cavity is formed, a light source arranged alongside the cavity and serving for generating light that propagates from the light source through the cavity, a fluid reservoir for receiving a fluid, and a microfluid pump, which is designed for shifting the fluid received in the fluid reservoir between the fluid reservoir and the cavity.

20 Claims, 8 Drawing Sheets

(51) Int. Cl.
  *F21V 14/00* (2018.01)
  *F21V 5/00* (2018.01)
  *F21V 8/00* (2006.01)
  *F21V 9/14* (2006.01)
  *F21Y 115/15* (2016.01)

(52) U.S. Cl.
  CPC ......... *G02B 6/0003* (2013.01); *G02B 6/0096* (2013.01); *F21V 9/14* (2013.01); *F21Y 2115/15* (2016.08)

(58) Field of Classification Search
  USPC ............. 362/96, 464; 313/110–117; 359/228
  See application file for complete search history.

(56) References Cited

U.S. PATENT DOCUMENTS

| | | | | |
|---|---|---|---|---|
| 9,804,607 | B1* | 10/2017 | Coleman | G05D 7/00 |
| 2008/0135480 | A1 | 6/2008 | Dumont D'ayot et al. | |
| 2008/0277606 | A1* | 11/2008 | Wang | B01L 3/5027 |
| | | | | 250/581 |
| 2009/0086064 | A1* | 4/2009 | Mackey | G02B 5/201 |
| | | | | 348/273 |
| 2012/0222365 | A1* | 9/2012 | Goossen | F24J 2/045 |
| | | | | 52/1 |
| 2014/0204450 | A1* | 7/2014 | Progler | F28D 20/0034 |
| | | | | 359/288 |
| 2014/0204452 | A1* | 7/2014 | Branson | G02B 26/02 |
| | | | | 359/290 |

FOREIGN PATENT DOCUMENTS

| | | |
|---|---|---|
| DE | 10162969 A1 | 7/2003 |
| EP | 2075630 A1 | 7/2009 |
| GB | 1227417 A | 4/1971 |
| WO | 0068612 A1 | 11/2000 |

OTHER PUBLICATIONS

German Office Action based on application No. 10 2015 103 794.7 (7 pages) dated Jun. 22, 2017 (Reference Purpose Only).
German Search Report based on Application No. 10 2015 103 794.7 (10 Pages) dated Nov. 9, 2015 (Reference Purpose Only).

* cited by examiner

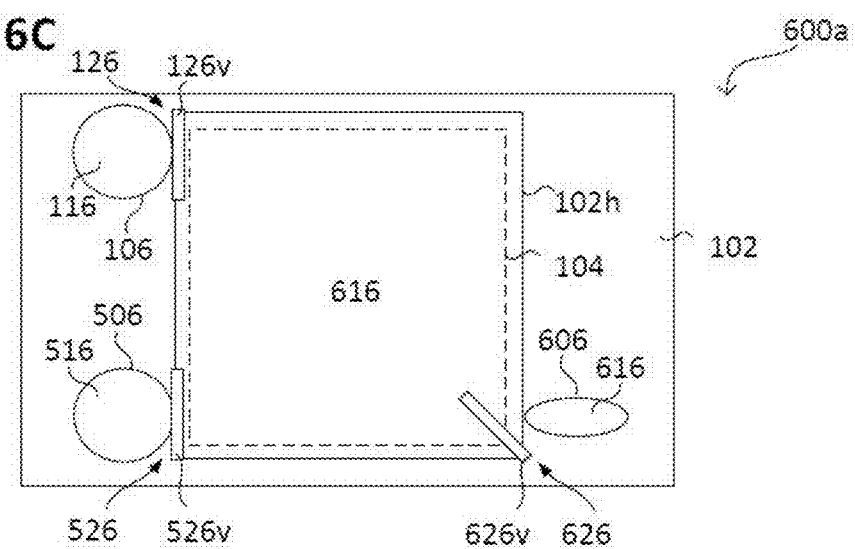

OPERATING STATE DEPENDENT APPEARANCE OF A LIGHTING DEVICE AND A METHOD THEREFORE UTILIZING MICROFLUIDS AND PUMP

CROSS-REFERENCE TO RELATED APPLICATION

This application claims priority to German Patent Application Serial No. 10 2015 103 794.7, which was filed Mar. 16, 2015, and is incorporated herein by reference in its entirety.

TECHNICAL FIELD

Various embodiments relate generally to a lighting device and a method for operating a lighting device.

BACKGROUND

In general, lighting devices can be used for a multiplicity of applications in which the generation of light is required. By way of example, lighting devices are used for displaying information, e.g. in displays, in advertising panels or in mobile radio devices, and/or for illuminating objects or spaces, e.g. in the form of flat illumination modules. Such lighting devices can be based on the principle of electroluminescence, which makes it possible to convert electrical energy into light with high efficiency. By way of example, said lighting devices may include semiconducting materials, e.g. in the form of organic light emitting diodes (OLEDs) or inorganic light emitting diodes (LEDs), which make it possible to generate and emit colored light in the form of patterns or with a specific color valence.

In the switched-off state, however, these lighting devices reflect externally generated light with a color valence that is determined by the design of the lighting devices. By adapting said color valence, it is possible for lighting devices in the switched-off state, e.g. during the day or when they are not in use, to be integrated into their environment particularly well, that is to say that they are particularly inconspicuous. This so-called off-state appearance (OSA) of the lighting devices is a major factor influencing economic aspects, such as the sales of lighting devices.

In order to influence the OSA, color filters, e.g. in the form of color filter films, are conventionally applied to lighting devices, such that they determine the OSA of the lighting devices. However, the generated light of the light source in the switched-on state of the lighting device is altered by the color filter since the latter absorbs part of the light. Therefore, the emission color of the light source has to be correspondingly adapted to the color filter in order to maintain a desired emission color in the switched-on state. In other words, the color filter dominates the OSA of the lighting device, or the light source thereof together with the OSA forms the desired color impression. However, such color filters lead to a loss of efficiency as a result of the light absorption and can furthermore be used only to a limited extent, e.g. if colored patterns are intended to be generated.

Alternatively, the OSA can be influenced by conversion layers which convert the wavelength of part of the light into a different wavelength and naturally have the desired color. By way of example, conversion layers including scattering conversion centers convert the emission characteristic of the surface light source into a Lambertian emitter. However, only a very restricted material selection is available for conversion layers and this likewise brings about a loss of efficiency as a result of light scattering.

These conventional solutions are static and, besides the OSA, likewise influence the color valence of the lighting device in the switched-on state.

SUMMARY

A lighting device includes a carrier, in which a laterally extended cavity is formed, a light source arranged alongside the cavity and serving for generating light that propagates from the light source through the cavity, a fluid reservoir for receiving a fluid, and a microfluid pump, which is designed for shifting the fluid received in the fluid reservoir between the fluid reservoir and the cavity.

BRIEF DESCRIPTION OF THE DRAWINGS

The drawings are not necessarily to scale, emphasis instead generally being placed upon illustrating the principles of the invention. In the following description, various embodiments of the invention are described with reference to the following drawings, in which:

FIGS. 6A to 6C show in each case a schematic cross-sectional view or side view of a lighting device in accordance with various embodiments in a method for operating the lighting device in accordance with various embodiments.

DESCRIPTION

Figure 1A:
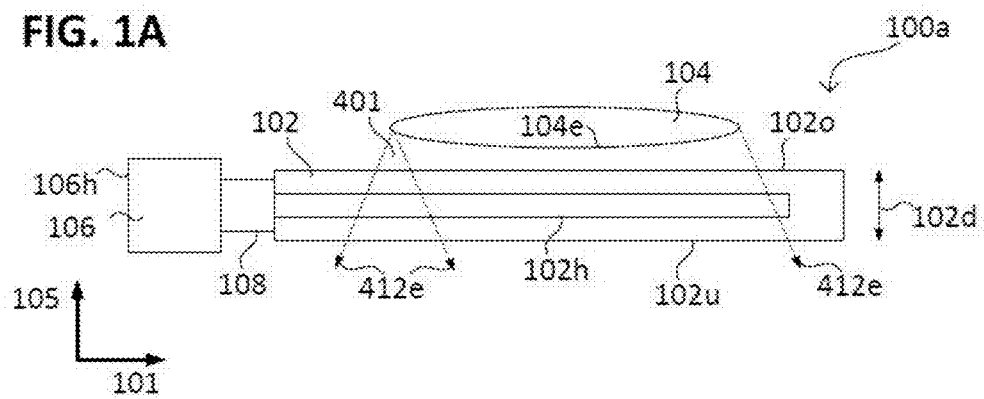
FIGS. 1A to 1C show in each case a schematic cross-sectional view or side view of a lighting device in accordance with various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since component parts of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various exemplary embodiments described herein can be combined with one another, unless specifically indicated otherwise. Therefore, the following detailed description should not be interpreted in a restrictive sense, and the scope of protection of the present invention is defined by the appended claims.

In the context of this description, the terms "connected", and "coupled", are used to describe both a direct and an indirect connection and a direct or indirect coupling. In the figures, identical or similar elements are provided with identical reference signs, insofar as this is expedient.

Furthermore, in the context of this description, the wording "above" in association with forming a layer can be understood to mean that a layer formed above a surface (e.g. of a carrier) or a component part (e.g. a carrier), is formed in direct physical contact with the surface or the component part. Furthermore, the wording "above" can be understood to mean that one or a plurality of further layers are arranged between the layer and the component part.

In accordance with various embodiments, the off-state appearance (OSA) of a lighting device is altered or set independently of the emission color of its light source and without macroscopic alteration on the lighting device. This alteration can be performed dynamically, e.g. can be regulated or controlled depending on an operating state of the lighting device. In other words, the light reflected and/or returned by the lighting device can be regulated or controlled. Alternatively or additionally, the OSA can be altered in a time-dependent manner, e.g. can be controlled or regulated depending on the time of day. This makes it possible to regulate or to control or to set the emission characteristic and emission color of the lighting device during operation.

Furthermore, the OSA of a lighting device in accordance with various embodiments can be altered or set without adversely affecting the efficiency of the lighting device during operation. Illustratively, no light is lost from the lighting device as a result of an adapted OSA. As a result, fewer lighting devices are required in order to generate a specific quantity of light, which saves considerable costs particularly in the field of high-efficiency lighting devices. Alternatively or additionally, the required structural space of the lighting device can be reduced.

Furthermore, in accordance with various embodiments, the production costs of lighting devices can be reduced since smaller amounts of conversion material or scattering material are required in order to achieve a specific OSA.

Furthermore, in accordance with various embodiments, it is possible to achieve a multiplicity of OSAs that are conventionally impracticable since they would result in excessively high light absorption when the lighting device is operated. In other words, the diversity of achievable OSAs can be increased. By way of example, in the case of high-efficiency OLEDs having a milky appearance as a result of scattering, it is possible to achieve a specularly reflective appearance in the switched-off state, e.g. a specularly reflective OSA.

In accordance with various embodiments, a lighting device may include the following: a carrier, in which a laterally extended cavity (also referred to as a microcavity) is formed; a light source arranged alongside the cavity and serving for generating light that propagates from the light source through the cavity; a fluid reservoir for receiving a fluid (also referred to as first fluid); and a microfluid pump (also referred to as first microfluid pump), which is designed for shifting the fluid received in the fluid reservoir between the fluid reservoir and the cavity.

In accordance with various embodiments, the carrier can be designed to be elastic, e.g. spring-elastic or flexible. Alternatively or additionally, the carrier includes a mechanically rigid region and/or a mechanically flexible region. Furthermore, the carrier can be light-transmissive, e.g. transparent and/or translucent.

In accordance with various embodiments, the microfluid pump can be arranged in the carrier. By way of example, the microfluid pump can be monolithically integrated in a chip. Alternatively or additionally, the microfluid pump can be monolithically integrated in the carrier, e.g. in the form of a chip.

In accordance with various embodiments, the carrier may include two segments (carrier elements), between which the cavity is formed, e.g. in the form of a gap between the carrier elements. The carrier, for example a carrier element, can be formed for example as a substrate of the light source, as a film or as a plate. By way of example, the carrier, for example a carrier element, can be plate-shaped.

In accordance with various embodiments, the fluid reservoir can be formed as a cavity in the carrier. In accordance with various embodiments, a carrier element can have a cutout which, when the carrier elements are joined together, forms the cavity. Furthermore, the cavity can cover, or mask, the light source.

Alternatively or additionally, the carrier may include for example more than two carrier elements, e.g. three carrier elements in the form of a baseplate, a frame and a cover plate. In this example, the frame can have a through opening which, when said frame is inserted between the baseplate and the cover plate, forms the cavity.

In accordance with various embodiments, the cavity can be formed as a gap (also referred to as interspace) between two carrier elements. The thickness of the cavity can be defined by and/or correspond to the distance between the two carrier elements or the thickness of a third carrier element inserted between the two carrier elements.

In accordance with various embodiments, the light source can be formed as a planar light emitting diode (also referred to as surface light source), e.g. as a planar organic light emitting diode, and this can have an encapsulation covering the organic light emitting diode. By way of example, the planar organic light emitting diode may include a continuous optically functional layer structure designed for converting electrical energy into electromagnetic radiation.

A surface light source can have a light emission surface which is extended in a plane, e.g. in a planar or curved plane.

In accordance with various embodiments, the encapsulation can be arranged on the opposite side of the organic light emitting diode relative to the carrier and/or the substrate.

In accordance with various embodiments, the microfluid pump can be designed to shift a volume of fluid in a range of approximately 500 µL/s to approximately 0.01 µL/s (this is also referred to as the pump rate), e.g. in a range of approximately 50 μL/s to approximately 0.1 μL's, in a range of approximately 5 μL/s to approximately 1 μL/s.

In this case, the cavity can be designed in a manner appropriately matching the microfluid pump, e.g. in such a way that turbulences can be prevented from arising when the fluid is shifted. In other words, the fluid can be shifted in such a way that it travels with laminar flow in the cavity. The greater the flow rate of the fluid, the greater the risk of turbulences forming, which is expressed in a higher Reynolds number.

The microfluid pump can enable a switching time of less than 250 ms, for example, with which the shifting is switched. By way of example, the pump rate and/or a pump direction can be switched or controlled, i.e. e.g. it is possible to switch over (pump direction) between expelling (shifting out) and introducing fluid (into or out of the cavity). By way of example, the switching time can be less than 200 ms, e.g. less than 100 ms, e.g. less than 50 ms. By way of example, the switching time can be in a range of approximately 10 ms to approximately 250 ms.

Illustratively, the lighting device can be designed such that the fluid can be shifted sufficiently rapidly and turbulences can be avoided. In accordance with various embodiments, the fluid can be shifted in such a way that the Reynolds number has a value in a range of approximately 10 to approximately 2500, e.g. in a range of approximately 20 to approximately 1200, e.g. in a range of approximately 100 to approximately 500.

In accordance with various embodiments, the cavity can have a cross-sectional area greater than a cross-sectional area of the light source (in other words, the cavity can completely cover the light source) and an extent of the cavity transversely with respect to the cross-sectional area of the cavity (i.e. a thickness of the cavity) can be in a range of approximately 0.1 μm to approximately 500 μm, e.g. in a range of approximately 1 μm to approximately 100 μm, e.g. in a range of approximately 5 μm to approximately 50 μm.

The thickness of the cavity can be measured in a direction transversely with respect to the longitudinal extension of said cavity; by way of example, the thickness of the cavity can correspond to the smallest extent of the cavity.

In accordance with various embodiments, the cavity can have a volume per area (in other words a scaled capacity) in a range of approximately 0.01 μL/cm$^2$ to approximately 50 μL/cm$^2$, e.g. in a range of approximately 0.1 μL/cm$^2$ to approximately 10 μL/cm$^2$, e.g. in a range of approximately 1 μL/cm$^2$ to approximately 5 μL/cm$^2$. The scaled capacity can be indicated or measured in a manner scaled to an area of the cavity (transversely with respect to the thickness), such that substrates of different sizes can be compared with one another. The total capacity of the cavity then results from the product of the scaled capacity of the cavity and the area (cross-sectional area) of the cavity.

Given an area of the cavity (transversely with respect to the thickness thereof, can e.g. substantially correspond to the luminous area of the optoelectronic component) of 1 cm$^2$, the capacity of the cavity can be in a range of approximately 0.01 μL to approximately 50 μL. On account of its small extent and capacity, the cavity can also be referred to as a microcavity.

In accordance with various embodiments, the fluid reservoir can have a volume greater than or equal to that of the cavity. Consequently, the fluid reservoir can suffice to keep fluid available for completely filling the cavity with the fluid.

In accordance with various embodiments, the cavity can be formed as a capillary extending in a meandering fashion in the carrier. By way of example, the capillary can be formed in the form of a groove (also referred to as a trench or slot) in a carrier element.

The cavity can be formed as a continuous cavity. Furthermore, the cavity can be stabilized in terms of its shape and/or its capacity by means of a stabilization structure. The stabilization structure can be part of the carrier and extend e.g. in the form of microcolumns or microwalls through the cavity. What can thus be achieved, for example, is that the cavity is altered only slightly if a carrier formed in an elastic fashion is bent, for example.

The microwalls can illustratively subdivide a continuous cavity, e.g. into a plurality of partial cavities connected to one another, e.g. in the form of a lattice or amygdaloid channel.

Alternatively or additionally, a plurality of the cavities can be formed in the carrier, e.g. in a manner stacked one above another or transversely with respect to the lateral extension of the cavities alongside one another, e.g. in the form of a pattern. As described above, a fluid can be introduced into each of the cavities by means of at least one separate microfluid pump. Consequently, by way of example, patterns can be produced or the OSAs of the individual fluids can be superimposed or combined with one another, e.g. blue with light-reflecting (e.g. metallically lustrous) to form metallic blue.

In accordance with various embodiments, the lighting device may furthermore include the fluid, wherein the fluid may include scattering particles or a conversion material, or wherein the fluid can be formed as light-reflecting, that is to say that the fluid reflects more light than it absorbs. Illustratively, a light-reflecting fluid can act as a specularly reflective fluid, for example. As a result, for example, a specularly reflective OSA or lustrous OSA can be achieved, for example for use in mirrors or in the automotive industry.

In accordance with various embodiments, the fluid can have a scaled volume (i.e. a scaled quantity of fluid or a scaled displacement, can be understood analogously to the scaled capacity of the cavity) in a range of approximately 0.01 μL/cm$^2$ to approximately 50 μL/cm$^2$, e.g. in a range of approximately 0.1 μL/cm$^2$ to approximately 10 μL/cm$^2$, e.g. in a range of approximately 1 μL/cm$^2$ to approximately 5 μL/cm$^2$. By way of example, the volume of the fluid can substantially correspond to the capacity of the cavity or e.g. be greater than the capacity of the cavity, e.g. approximately 10% greater.

On account of the small volume, the fluid can also be referred to as a microfluid.

Given an area of the cavity (transversely with respect to the thickness thereof, can e.g. substantially correspond to the luminous area of the optoelectronic component) of 1 cm$^2$, the volume of the fluid can be e.g. in a range of approximately 0.01 μL to approximately 50 μL.

In accordance with various embodiments, the fluid can have a dynamic viscosity in a range of approximately 0.5 mPa·s to approximately $10^2$ mPa·s, e.g. in a range of approximately 1 mPa·s to approximately 50 mPa·s, in a range of approximately 5 mPa·s to approximately 10 mPa·s.

In accordance with various embodiments, the microfluid pump can be designed for shifting fluid depending on an operating voltage of the light source (or of the lighting device). For this purpose, the lighting device may include for example a controller and a sensor coupled to the controller, which sensor measures the operating voltage and feeds information representing the operating voltage to the controller, which controls or regulates the microfluid pump on the basis of the information. The controller can control or regulate e.g. an energy source that supplies the microfluid pump with energy, or can control or regulate, e.g. alter, an operating state of the microfluid pump, e.g. an on state or off state. Setting of an OSA can be performed by means of the controller.

In accordance with various embodiments, the lighting device may furthermore include a further fluid reservoir for receiving a further fluid (also referred to as second fluid), which is displaced upon the shifting of the fluid into the cavity by the fluid from the cavity. What can thus be achieved is that the first fluid and the second fluid can be brought into the cavity alternately, e.g. reversibly.

In accordance with various embodiments, the lighting device can furthermore include a further microfluid pump (also referred to as a second microfluid pump), which is designed for shifting further fluid between the further fluid reservoir and the cavity. The shifting of the first fluid and of the second fluid can thus be better controlled or regulated, with the result that turbulences can be prevented from arising. The second microfluid pump can likewise be controlled or regulated by the controller, or a further controller analogously thereto.

In accordance with various embodiments, the cavity can be designed in such a way that upon shifting the first fluid and the second fluid do not mix. This can be achieved, for example, by turbulences being prevented from arising. If the first fluid and the second fluid travel with laminar flow, illustratively they can be prevented from mixing together over and above diffusion processes. In accordance with various embodiments, the first fluid and the second fluid can be prevented from mixing together even if they are soluble in one another.

In accordance with various embodiments, the lighting device can furthermore include the second fluid. Alternatively or additionally, the first fluid and the second fluid can be set up orthogonally with respect to one another. Two fluids are orthogonal with respect to one another if one fluid is e.g. polar and the other fluid is e.g. apolar. A polar fluid is usually insoluble in an apolar fluid.

By way of example, the first fluid may include or consist of a first carrier liquid (e.g. a first solvent) and the second fluid may include or consist of a second carrier liquid (e.g. a second solvent). Solid substances (solids) and liquids which dissolve in a polar carrier liquid are usually insoluble in an apolar carrier liquid. In this regard, by means of orthogonal carrier liquids it is possible to use two or more fluids, without the latter being soluble in one another.

In accordance with various embodiments, the first fluid can be polar and the second fluid can be apolar, or the first fluid can be apolar and the second fluid can be polar.

In accordance with various embodiments, a lighting device may include the following: a planar light source (also referred to as a surface light source) for generating light that is emitted away from a light emission surface of the light source; a carrier covering the light emission surface, in which carrier a cavity is formed in such a way that light emitted by the light source is emitted through the cavity; a fluid reservoir for receiving a fluid; and a microfluid pump, which is designed for shifting, e.g. reversibly, fluid between the fluid reservoir and the cavity.

In accordance with various embodiments, a method for operating a lighting device includes the following: shifting (i.e. introducing) a first fluid into a cavity of the lighting device in a first operating state of the lighting device; and shifting (i.e. introducing) a second fluid into the cavity in a second operating state of the lighting device. An operating state of the lighting device can be defined by an operating voltage of the lighting device; by way of example, the first operating state can be defined by a first operating voltage and the second operating state can be defined by a second operating voltage. The first operating voltage can be for example a voltage at which the lighting device generates and emits light, and the first operating state can be an on state of the lighting device. The second operating voltage can be for example a voltage at which the lighting device generates and emits no light, e.g. the second operating voltage can be zero, and the second operating state can be an off state of the lighting device.

In accordance with various embodiments, shifting the first fluid and/or the second fluid can be carried out by means of a microfluid pump, e.g. reversibly.

The light generated by the light source may include for example ultraviolet (UV) light, visible light and/or infrared (IR) light. Furthermore, the wavelength of the light or the wavelength spectrum of the light can be in the UV range, in the visible range and/or in the IR range.

In accordance with various embodiments, a light source can be based on the principle of electroluminescence.

In accordance with various embodiments, a light source may include or be formed from an optically functional layer structure. In accordance with various embodiments, the light source can be formed as an optoelectronic component, i.e. the optically functional layer structure may include one or a plurality of semiconductors (e.g. organic semiconductors or inorganic semiconductors), e.g. in the case of an organic optoelectronic component in the form of an organic light emitting diode (OLED) or in the case of an inorganic optoelectronic component in the form of an inorganic light emitting diode (LED). Alternatively or additionally, the light source may include an electroluminescent film.

In other words, the optically functional layer structure can be part of an optoelectronic component.

In accordance with various embodiments, the optically functional layer structure may include a plurality of organic and/or inorganic layers which are stacked one above another and form a so-called layer stack. By way of example, more than three, more than four, more than five, more than six, more than seven, more than eight or more than nine layers can be formed one above another, e.g. more than ten, e.g. more than twenty, layers.

Alternatively or additionally, the optoelectronic component may include at least one further layer, e.g. a layer formed as an electrode, a barrier layer or an encapsulation layer. Alternatively or additionally, the optoelectronic component may include a plurality of further layers, as mentioned above, e.g. in combination with one another.

Forming a layer (e.g. an organic or inorganic layer, a layer of the optically functional layer structure and/or a layer of an optoelectronic component) can be carried out by means of liquid phase processing, for example. Liquid phase processing may include dissolving or dispersing a substance for the layer (e.g. for an organic layer or an inorganic layer, e.g. a ceramic or metallic layer) in a suitable solvent, for example in a polar solvent such as water, dichlorobenzene, tetrahydrofuran and phenetole, or for example in an apolar solvent such as toluene or other organic solvents, for example in fluorine-based solvent, also called perfluorinated solvent, in order to form a liquid phase of the layer.

Furthermore, forming the layer by means of liquid phase processing may include forming, e.g. applying, the liquid phase of the layer by means of liquid phase deposition (also referred to as a wet-chemical method or wet-chemical coating) on or above a surface to be coated (e.g. on or above the substrate or on or above some other layer of the organic optoelectronic component).

Alternatively or additionally, forming a layer can be carried out by means of vacuum processing. Vacuum processing may include forming a layer (e.g. an organic layer and/or an inorganic layer) by means of one or a plurality of the following methods: atomic layer deposition (ALD), sputtering, thermal evaporation, plasma enhanced atomic layer deposition (PEALD), plasmaless atomic layer deposition (PLALD) or chemical vapor deposition (CVD), e.g. a plasma enhanced chemical vapor deposition (PECVD) method or a plasmaless chemical vapor deposition (PLCVD) method.

One or a plurality of layers, e.g. organic layers of the organic optoelectronic component can be interlinked with one another, e.g. after they have been formed. In this case, a multiplicity of individual molecules of the layers can be interlinked with one another to form a three-dimensional network. This may improve the resistance of the organic optoelectronic component, e.g. with respect to solvents and/or environmental influences.

In the context of this description, the term "light-reflecting" can be understood to mean that a substance, a component part or an object (e.g. a surface thereof) has a reflectance such that it reflects more light than it absorbs and/or transmits. A light-reflecting substance, component part or object (e.g. a layer, a substrate or a fluid) can have a reflectance that is greater than approximately 50%, e.g. greater than approximately 60%, e.g. greater than approximately 70%, e.g. greater than approximately 80%, e.g. greater than approximately 90%. By way of example, the reflectance can be in a range of approximately 70% and approximately 99%.

If a high reflectance, e.g. greater than approximately 80%, is combined with a low roughness of the substance, of the component part or of the object (e.g. the surface thereof), it is possible to achieve an imaging light reflection, i.e. a specularly reflective light reflection, which, e.g. in the context of the OSA, can be referred to as a specularly reflective OSA. A specularly reflective light reflection can be achieved for example with a roughness which is less than approximately half of the wavelength of the reflected light.

With increasing roughness, the proportion of the light which is reflected in a disordered manner in all directions, i.e. is scattered, increases. The light reflected in a disordered manner in all directions can also be referred to as returned light.

In the context of this description, the term "light-transmissive" can be understood to mean that a substance, or a component part or an object (e.g. a surface thereof) has a transmittance such that a large part of the light impinging thereon passes through it, e.g. more than is absorbed and/or reflected by it. A light-transmissive body can be formed as e.g. opaque, translucent or even transparent.

A light-transmissive substance, component part or object (e.g. a layer, a substrate or a fluid) can have a transmittance which is greater than approximately 50%, e.g. greater than approximately 60%, e.g. greater than approximately 70%, e.g. greater than approximately 80%, e.g. greater than approximately 90%. By way of example, the transmittance can be in a range of approximately 70% and approximately 99%.

In the case of thin light-reflecting layers, for example, a part of the light can pass (transmit) through the layer, e.g. to a greater extent the thinner the layer (i.e. the smaller the layer thickness of the layer). Therefore, the amount of light reflected by the layer can be all the less, the thinner the layer, which can have the consequence that a greater reflectance of the layer is required for a smaller layer thickness, e.g. in order achieve a specularly reflective OSA.

Analogously thereto, a light-nontransmissive substance, component part or object (e.g. a layer, a substrate or a fluid) can have a transmittance which is less than approximately 50%, e.g. less than approximately 40%, e.g. less than approximately 30%, e.g. less than approximately 20%, e.g. less than approximately 10%. By way of example, the transmittance can be in a range of approximately 0% and approximately 20%.

In the context of this description, the terms "light-transmissive", "light-nontransmissive" and "light-reflecting" can be understood with respect to at least one wavelength range of the electromagnetic radiation, for example in at least one range of visible light, for example in a wavelength range of approximately 380 nm to 780 nm.

In the context of this description, an optoelectronic component can be understood to mean a component which emits or absorbs electromagnetic radiation by means of a semiconductor component. The electromagnetic radiation can be for example light in the visible range, UV light and/or infrared light, e.g. light of a color valence (also referred to in that case as emission color).

In accordance with various embodiments, an optoelectronic component can be formed as an electromagnetic radiation generating and emitting component, e.g. as a light emitting diode (LED), as an organic light emitting diode (OLED), as a light emitting transistor or as an organic light emitting transistor.

In accordance with various embodiments, an optoelectronic component can be formed as an electromagnetic radiation absorbing component, e.g. as a light absorbing diode or transistor, for example as a photodiode, or as a solar cell.

In accordance with various embodiments, the optoelectronic component can be part of an integrated circuit. Alternatively or additionally, a plurality of electromagnetic radiation absorbing components can be provided, for example in a manner arranged on or above a common carrier (and/or substrate) and/or in a manner accommodated in a common housing. By way of example, a plurality of components can be formed from a common optically functional layer structure. A plurality of electromagnetic radiation emitting components can for example interact with one another and e.g. generate and emit light being mutually superimposed, with the result that e.g. a color valence such as white can be set or a colored pattern, e.g. an image, can be generated.

In the context of this description, a color of a body or of a light and/or a color valence of a light can be understood to mean a wavelength range of an electromagnetic radiation that is associated with the color or color valence. A color valence can be specified as a color locus in a standard chromaticity diagram.

In accordance with various embodiments, an organic optoelectronic component may include one or a plurality of organic layers. Additionally, the organic optoelectronic component may include one or a plurality of inorganic layers (e.g. in the form of electrodes or barrier layers).

In the context of this description, an organic layer can be understood to mean a layer which includes or is formed from an organic material. Analogously thereto, an inorganic layer can be understood to mean a layer which includes or is formed from an inorganic material. Analogously thereto, a metallic layer can be understood to mean a layer which includes or is formed from a metal.

Compound in the sense of a substance (e.g. an organic, inorganic or organometallic compound) can be understood to mean a substance composed of two or more different chemical elements which are chemically bonded together, for example a molecular compound (also referred to as a molecule), an ionic compound, an intermetallic compound or a higher-order compound (also referred to as a complex). The term "material" can be used synonymously with the term "substance".

In the context of this description, a metal may include at least one metallic element, e.g. copper (Cu), silver (Ag), platinum (Pt), gold (Au), magnesium (Mg), aluminum (Al), barium (Ba), indium (In), calcium (Ca), samarium (Sm) or lithium (Li). Furthermore, a metal may include a metal compound (e.g. an intermetallic compound or an alloy), e.g. a compound composed of at least two metallic elements, such as e.g. bronze or brass, or e.g. a compound composed of at least one metallic element and at least one nonmetallic element, such as e.g. steel.

In the context of this description, an OSA of a lighting device can be understood to mean the characteristic (i.e. the color valence and the intensity) of light (e.g. externally generated light) that is reflected and/or returned by the lighting device, e.g. when the latter is in an off state. By way of example, a first OSA of a lighting device can be understood to mean that the lighting device reflects and/or returns light with a first color valence and first intensity. Analogously thereto, a second OSA of the lighting device can be understood to mean that the lighting device reflects and/or returns light with a second color valence and second intensity. The color valence and/or intensity of the first OSA can differ from those/that of the second OSA.

In the context of this description, fluid can be understood to mean a substance which offers no resistance to an arbitrarily slow shear (i.e. which has a finite viscosity). A fluid may include or be formed from a gas or include or be formed from a liquid. In other words, the fluid can be liquid or gaseous. In general, a liquid can undergo transition to a gas, i.e. evaporate, above a critical temperature, wherein the gas can undergo transition to the liquid, i.e. can condense, below the critical temperature. The critical temperature of a fluid can generally be dependent on a pressure that is exerted on the fluid. Upon transition from a liquid to a gas, the volume of the fluid can increase. This can be exploited, for example, for shifting a part of the fluid, as is described further below.

If the transition of the fluid between liquid and gas is not desired, it is possible to choose a fluid which has a sufficiently high or low critical temperature, such that its state can be maintained.

As described above, a polar fluid may include or consist of a polar carrier liquid and an apolar fluid may include or essentially consist of an apolar carrier liquid.

Furthermore, a fluid may include a conversion material and/or a filter material, which can be dissolved or dispersed in the carrier liquid, for example. By way of example, the conversion material used can be an organic conversion material and quantum dots in the fluid, since a substantially homogeneous solution or dispersion or suspension may be advantageous. Examples of organic conversion material are fluoresceins, cumarins, rhodamines, stilbenes, porphyrins, phthalocyanines, pyrenes.

Furthermore, a fluid can act as a polarization filter and be designed to alter a polarization of light which is transmitted by the fluid or is reflected by the fluid, e.g. depending on an electrical voltage applied to the fluid.

Alternatively or additionally, a fluid may include a multiplicity of particles, such as e.g. magnetic particles, phototropic particles, conversion particles, filter particles or scattering particles. Conversion particles may include or consist of a conversion material. Filter particles may include or consist of a filter material. Scattering particles may include a material having a high refractive index, e.g. having a refractive index of greater than 2. The particles can have an average size in a range of approximately 1 nm to approximately 1 μm, e.g. in a range of approximately 10 nm to approximately 100 nm; for example, the particles can be formed in the form of nanoparticles.

The fluid may include organic and/or inorganic liquid (e.g. carrier liquid). Alternatively or additionally, the fluid may include organic and/or inorganic particles. Alternatively or additionally, the fluid may include organic and/or inorganic conversion material. Alternatively or additionally, the fluid may include organic and/or inorganic filter material.

The fluid may include or be formed from an optically functional substance. In accordance with various embodiments, the fluid can be formed as a so-called optically functional liquid. Electromagnetic radiation, e.g. electromagnetic radiation emitted by the light source or electromagnetic radiation generated outside the lighting device, can be referred to as first electromagnetic radiation. The fluid can be designed in such a way that at least one proportion of the first electromagnetic radiation is converted into a second electromagnetic radiation. For example, the second electromagnetic radiation can have a different direction of propagation than the first electromagnetic radiation. By way of example, the second electromagnetic radiation can have a different color valence than the first electromagnetic radiation. On account of the interaction with electromagnetic radiation, the fluid can also be referred to as an optically functional fluid.

The refractive index of the fluid can be matched to the refractive index of the carrier or of the substrate, and can be for example similar to the refractive index of glass. Alternatively or additionally, the fluid may include or be formed from a further liquid, for example a liquid having a high refractive index, such as quinoline (has a refractive index of approximately 1.63); oil, such as, for example, edible oil (has a refractive index of approximately 1.4 to approximately 1.6); a concentrated aqueous sugar solution (has a refractive index of approximately 1.5); glycerol (has a refractive index of approximately 1.5); and/or diiodomethane (has a refractive index of approximately 1.74).

As an alternative or in addition to a liquid, the fluid may include or be formed from a gel, e.g. a viscoelastic gel or an index matching gel.

In the context of this description, a microfluid pump can be understood to mean a device that is able to shift small amounts of fluid, e.g. in the microliter range, as described above, i.e. to transport them between a first region and a second region.

A microfluid pump can be formed for example as a microelectromechanical pump (microelectromechanical system—MEMS), which can have a size of a few micrometers, e.g. in a range of approximately 1 μm to approximately 1000 μm. Alternatively or additionally, a microfluid pump can be formed in the form of a chip, e.g. as a monolithic circuit.

Alternatively or additionally, a microfluid pump can be based on the displacement principle and can be formed as a so-called microfluid displacement pump. A microfluid displacement pump may include a displacement body that deforms depending on an operating voltage applied to the microfluid displacement pump, such that said displacement body can e.g. expand, contract and/or curve. Furthermore, the microfluid displacement pump may include a cavity into which the displacement body expands, such that in this case fluid situated in the cavity is displaced and passes out of the microfluid displacement pump. Furthermore, the displacement body can draw in fluid when it contracts again, such that either transport of fluid through the microfluid displacement pump is achieved or the fluid previously displaced from the microfluid displacement pump passes into the microfluid displacement pump again.

In order to deform the displacement body, the thermal expansion of the displacement body can be utilized, for example. The displacement body can be formed for example as a thermopneumatic displacement body that is deformed depending on its temperature.

Alternatively or additionally, other effects can be utilized for deforming the displacement body, such as the piezoelectric effect or electrostatic repulsion, for example, both of which can be controlled or regulated by means of an electrical voltage.

Likewise for that purpose the shape of a displacement body formed as an electrolysis displacement body can be dependent on the electrical voltage. The electrolysis displacement body may include for example a substance which, upon application of an electrical voltage, forms a gas that displaces the fluid. Analogously thereto, the displacement body can be formed as a thermal displacement body that forms a gas when it is heated above the critical temperature mentioned above. Alternatively or additionally, the displacement body can be formed at least partly from the fluid. In other words, part of the fluid itself can be converted into a gas or expand in order to displace the rest of the fluid.

Alternatively or additionally, a microfluid pump may include a flow-generating drive unit, which is designed for converting electrical energy into a force acting on the fluid or the displacement body and sets the fluid (or the displacement body) in motion, for example on the basis of electrowetting, thermocapillary motion, magnetohydrodynamic motion or electrocapillary motion.

Alternatively or additionally, a microfluid pump may include, as a flow-generating drive unit, a surface wave generator, which sets a fluid or a displacement body in motion and thereby shifts it by means of surface waves.

In contrast to a macrofluid pump, in the case of a microfluid pump, for the most part (e.g. completely) moving parts can be dispensed with. By way of example, rotating parts as well as actuators, such as e.g. inductively operating motors, can be dispensed with since electrical energy, e.g. without requiring actuators, can be converted into a force acting on the fluid, such that the latter moves. In contrast to macroscopic pumps, oscillating membranes can be used; electric or magnetic fields can also be employed as a result of the small amounts of fluid.

A microfluid pump can have a first opening (can also be referred to as inlet opening), through which fluid can be introduced into the microfluid pump, e.g. received (e.g. sucked in) by the microfluid pump. In addition, through the first opening, said fluid can be expelled again from the microfluid pump, e.g. forced out by the microfluid pump. In this case, the microfluid pump may include a fluid reservoir dimensioned in such a way that enough fluid can be received and kept available. By way of example, a displacement body can expand into the fluid reservoir of the microfluid pump.

The first opening can be connected to the cavity, such that through the first opening the microfluid pump can release fluid into the cavity and receive it again.

Alternatively or additionally, the microfluid pump can have a second opening (can also be referred to as outlet opening), through which fluid can be expelled from the microfluid pump. In this case, the fluid can be transported through the microfluid pump. By way of example, the microfluid pump can receive the fluid from an external fluid reservoir.

The first opening of the microfluid pump can be connected to the fluid reservoir, for example such that fluid from the fluid reservoir can be introduced through the first opening into the microfluid pump, e.g. when the latter sucks in fluid through the first opening. The second opening of the microfluid pump can be connected to the cavity, for example, such that fluid from the microfluid pump can be introduced through the second opening into the cavity, e.g. when the microfluid pump forces fluid out through the second opening. As a result, the fluid can be shifted from the fluid reservoir into the cavity.

Depending on the operating state of the microfluid pump, the function of the first opening and of the second opening can be interchanged reversibly such that the microfluid pump shifts the fluid from the fluid reservoir into the cavity in a first operating state and shifts the fluid from the cavity into the fluid reservoir in a second operating state (also referred to as operating mode). In other words, the microfluid pump can be designed for shifting the fluid to and fro.

By means of the fluid being shifted (i.e. introduced) into the cavity, the latter can be filled with fluid. By means of the fluid being shifted (i.e. expelled) from the cavity, the latter can be freed of the fluid, in other words emptied.

Alternatively or additionally, the fluid can be shifted through a fluid connection that connects the cavity to the microfluid pump and/or connects the microfluid pump to the fluid reservoir. A fluid connection may include a microvalve for opening and closing the fluid connection. The connection between the cavity and the microfluid pump and/or the microfluid pump and the fluid reservoir can be interrupted or established by means of the microvalve.

A microvalve may include a micromechanically movable plunger, which may include or be formed from the material of the substrate or of the carrier, for example. Alternatively or additionally, a micromechanically movable plunger may include or be formed from monocrystalline silicon.

The micromechanically movable plunger can be moved, e.g. deflected, by means of electrical energy, e.g. an electrical voltage or an electrical current. Moving the micromechanically movable plunger can be effected for example by means of a stiffened silicon membrane carrying the micromechanically movable plunger and/or by means of a piezoceramic. Alternatively or additionally, the micromechanically movable plunger may include or be formed from a piezoceramic.

A fluid connection can be opened or closed, for example, by movement of the micromechanically movable plunger.

The fluid introduced into the cavity can spread in the cavity and flow through the latter in the process. The smaller a cross section of the cavity and the higher a flow velocity (the velocity at which the fluid flows) of the fluid, the greater the risk of turbulences arising. The relationship between the structural shape of the cavity and the properties of the fluid can be expressed by the Reynolds number, which is calculated from: $v \cdot d/\mu$. In this case, $v$ denotes the flow velocity of the fluid, $d$ denotes the characteristic extent of the cavity and $\mu$ denotes the kinematic viscosity of the fluid.

The kinematic viscosity of the fluid is a measure of the viscosity of a fluid and corresponds to the quotient of the dynamic viscosity of the fluid and density thereof. The characteristic extent of the cavity, also called reference length, can be defined for the respective problem and the shape of the cavity and can correspond to an extent of the cavity transversely with respect to the flow direction.

If the cavity is formed for example in the form of a capillary, the characteristic extent of the cavity can correspond to the diameter of the capillary. If the capillary has an elliptical diameter, the characteristic extent of the cavity can correspond to the minor semiaxis of the ellipse. If the capillary has a rectangular diameter, the characteristic extent of the cavity can correspond to the smaller side length of the rectangle (i.e. to the smaller extent of the cross-sectional area of the cavity). If the capillary has an oval diameter, the characteristic extent of the cavity can correspond to the smallest extent of the cavity (i.e. the cross section thereof) transversely with respect to the flow direction. Analogously thereto, the characteristic extent of the cavity can correspond to the smallest extent of the cavity transversely with respect to the flow direction if the cavity is shaped e.g. irregularly or e.g. in a plate-shaped fashion, e.g. with a smallest extent that is significantly smaller than the extents of the cavity in the flow direction.

In accordance with various embodiments, the appearance of a light source, e.g. of an OLED, can be set individually without macroscopically switched-on alteration. By way of example, on a light source having a diffuse appearance, it is possible to achieve a specularly reflective OSA. Alternatively or additionally, by means of using more than two fluids, for example liquids, in combination with microvalves, different OSDs of the lighting device can be set independently of the emission color thereof and independently of the appearance of the actual light source (e.g. of an OLED). Alternatively or additionally, the production of the microfluidic attachment, i.e. of the parts necessary for adapting the OSD, can be carried out partly or completely independently of the production of the light source (e.g. of an OLED). Alternatively or additionally, in the case of corresponding lateral (i.e. laterally extended) application of the fluid reservoirs (e.g. liquid reservoirs) outside the substrate surface of an OLED, no additional space requirement may be necessary. In accordance with various embodiments, a light source (e.g. an OLED) can be applied to a substrate, e.g. to glass, to plastic and to metal film.

Figure 1B:
Figure 1C:

FIG. 1A to FIG. 1C illustrate in each case a schematic cross-sectional view or side view of a lighting device in accordance with various embodiments.

FIG. 1A illustrates a schematic cross-sectional view or side view of a lighting device 100a in accordance with various embodiments.

The lighting device 100a may include a carrier 102, in which a laterally extended cavity 102h is formed. The carrier 102 may have a longitudinal extension in a lateral direction (direction 101) and a thickness 102d transversely with respect to the lateral direction (i.e. a thickness 102d in the direction 105). In other words, an extent of the carrier 102 in the lateral direction can be greater than an extent (thickness 102d) of the carrier 102 transversely with respect to the lateral direction. The carrier 102 can have a first main surface 102o (can also be referred to as upper main surface) and a second main surface 102u (can also be referred to as lower main surface) situated opposite the first main surface 102o. The first main surface 102o and the second main surface 102u can delimit the carrier 102 transversely with respect to the longitudinal extension thereof.

The thickness 102d of the carrier 102 can have a value in a range of 1 mm to 10 mm, e.g. in a range of approximately 2 mm to approximately 5 mm.

The cavity 102h can be extended in the lateral direction of the carrier 102. In other words, an extent of the cavity 102h in the lateral direction can be greater than an extent (thickness) of the cavity 102h transversely with respect to the lateral direction. In addition, the cavity 102h can extend between the first main surface 102o of the carrier 102 and the second main surface 102u of the carrier 102.

The lighting device 100a may include a light source 104 arranged alongside the cavity 102h, said light source being designed for generating light 412e. The generated light 412e can propagate from a light emission surface 104e of the light source 104 through the cavity 102h, e.g. with a direction component transversely with respect to the lateral direction. In other words, the light source 104 can have a light propagation region in which it emits light 412e, wherein the light propagation region penetrates through the cavity 102h and the cavity 102h extends through the light propagation region (e.g. laterally).

Figure 4A:
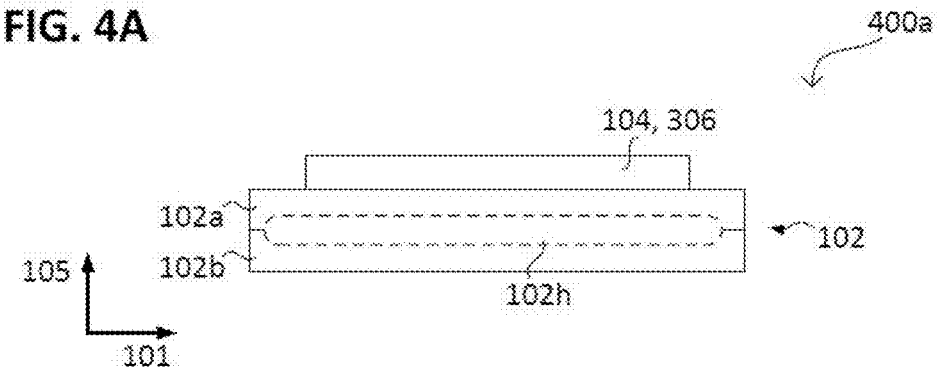
FIGS. 4A and 4B show in each case a schematic cross-sectional view or side view of a lighting device in accordance with various embodiments.

The light source 104, e.g. a light emitting diode, can emit light 412e with an aperture angle 401 (can also be referred to as emission angle) which is defined by the design of the light source 104, and determines the emission characteristic of the light source 104 (also cf. FIG. 4A). Illustratively, the emitted light 412e can then form a so-called light cone that images the light propagation region. By way of example, the aperture angle 401 can have a value in the range of 5° to 45°.

The cavity 102h can be designed, e.g. dimensioned, relative to the extent of the light source 104 and the emission characteristic thereof, in such a way that light 412e emitted away from the light source 104 propagates completely or substantially completely (e.g. more than 90% of the emitted light 412e) through the cavity 102h. To put it another way, the cavity 102h can cover the light source 104 completely or substantially completely (e.g. more than 90% of the light source 104) and, alternatively or additionally, can project, i.e. protrude, laterally beyond said light source and, illustratively, can conceal said light source (e.g. projected onto the first main surface 102o of the carrier 102). What can thus be achieved is that no regions having a different appearance (illustratively a brighter/darker edge) arise in the switched-on state (on state) of the lighting device 100a.

The light source 104 can be arranged and aligned relative to the carrier 102 in such a way that the light emission surface 104e of the light source 104 is directed in the direction of the carrier 102. The carrier 102 can cover the light source 104 completely or substantially completely (e.g. more than 90% of the light source 104) and, alternatively or additionally, can project, i.e. protrude, laterally (i.e. in the lateral direction) beyond said light source and, illustratively, can conceal said light source (e.g. projected onto the first main surface 102o of the carrier 102).

Furthermore, the lighting device 100a may include a fluid reservoir 106 for receiving a fluid (not illustrated). The fluid reservoir 106 can be formed for example as a cavity in a housing 106h, which can be part of the lighting device 100a.

Furthermore, the lighting device 100a may include a microfluid pump 108, which is designed for shifting fluid between the fluid reservoir 106 and the cavity 102h. The microfluid pump 108 can be directly coupled to the fluid reservoir 106 and the cavity 102h, i.e. a first opening of the microfluid pump 108 can be connected to the fluid reservoir 106 and a second opening of the microfluid pump 108 can be connected to the cavity 102h in the carrier 102.

Alternatively or additionally, the lighting device 100a may include a first fluid connection (not illustrated), e.g. a tube connection, which connects the first opening of the microfluid pump 108 to the fluid reservoir 106. Alternatively or additionally, the lighting device 100a may include a second fluid connection (not illustrated), e.g. a tube connection, which connects the second opening of the microfluid pump 108 to the cavity 102h in the carrier 102. If the second fluid connection is used, it can be formed for example at least partly as an elongate or tubular cavity, e.g. as a channel, in the carrier 102.

The microfluid pump 108 can be fixed, e.g. adhesively bonded or screwed, for example to the carrier 102.

In accordance with various embodiments, a part of the carrier 102 can have a hydrophobic or hydrophilic coating that partly or completely surrounds the cavity 102h. Consequently, the fluid can be shifted more efficiently between the cavity 102h and the fluid reservoir 106, for example without leaving residues, if the fluid is expelled from the cavity 102h.

FIG. 1B illustrates a schematic cross-sectional view or side view of a lighting device 100b in accordance with various embodiments. The lighting device 100b illustrated in FIG. 1B substantially corresponds to the lighting device 100a illustrated in FIG. 1A, wherein the microfluid pump 108 is arranged in the carrier 102. By way of example, the microfluid pump 108 can be arranged in a cutout in the carrier 102.

A compact design of the lighting device 100b can be made possible as a result.

The fluid reservoir 106 can be fixed, e.g. adhesively bonded or screwed, to the carrier 102, for example. If the first fluid connection is used, it can be formed for example at least partly as an elongate or tubular cavity in the carrier 102.

FIG. 1C illustrates a schematic cross-sectional view or side view of a lighting device 100c in accordance with various embodiments. The lighting device 100c illustrated in FIG. 1B substantially corresponds to the lighting device 100a illustrated in FIG. 1A, wherein the microfluid pump 108 and the fluid reservoir 106 are arranged in the carrier 102.

An even more compact design of the lighting device 100c can be made possible as a result.

The fluid reservoir 106 can be arranged for example as a cavity in the carrier 102. By way of example, the microfluid pump 108 can be arranged between the fluid reservoir 106 and the cavity 102h in the carrier 102.

If the first fluid connection and/or a second fluid connection are/is used, they/it can be formed in each case as an elongate or tubular cavity in the carrier 102.

Figure 2A:
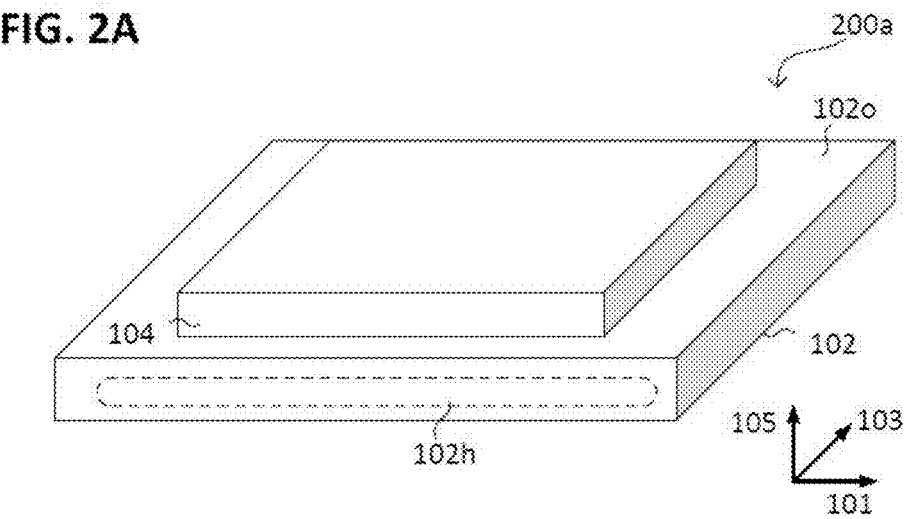
FIG. 2A shows a schematic perspective view of a lighting device in accordance with various embodiments.
Figure 2B:
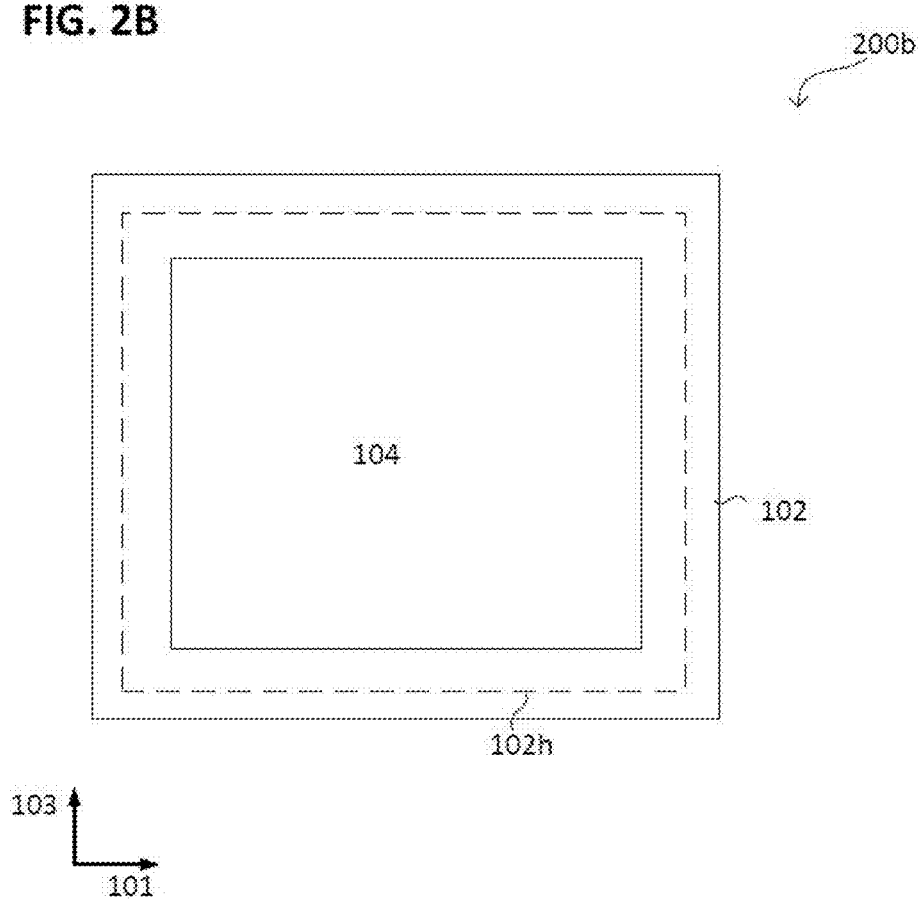
FIG. 2B shows a schematic cross-sectional view or plan view of a lighting device in accordance with various embodiments.

FIG. 2A illustrates a lighting device 200a in accordance with various embodiments in a perspective view and FIG. 2B illustrates a lighting device 200b in accordance with various embodiments in a schematic plan view or cross-sectional view, e.g. the lighting device 200a illustrated in FIG. 2A in a schematic plan view or cross-sectional view.

The light source 104 can be formed as a planar (e.g. plate-shaped) light source 104. In other words, the light emission surface (concealed in the view) of the light source 104 can be formed such that it is flat (planar). Alternatively or additionally, the light emission surface of the light source 104 can be curved, for example if the carrier 102 is formed in an elastic fashion.

In accordance with various embodiments, the light source 104 can be arranged with its light emission surface in direct contact with the carrier 102, e.g. with the first main surface 102o of the carrier 102.

The cavity 102h can have, in at least one direction (e.g. direction 101) transversely with respect to the thickness 102d of the carrier 102, an extent that is greater than the extent of the light source 104. In accordance with various embodiments, the cavity 102h can have, in a further direction (e.g. direction 103), transversely with respect to the thickness and transversely with respect to the direction 101, an extent that is greater than the extent of the light source 104. What can thus be achieved is that the light source 104 or at least the light emission surface thereof can be completely covered by the cavity 102h and the carrier 102.

Figure 3A:
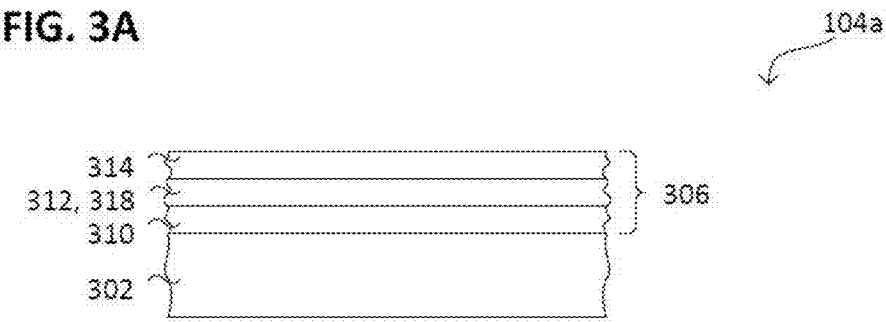
FIGS. 3A to 3C show in each case a schematic cross-sectional view or side view of a light source in a method for producing a light source.
Figure 3B:
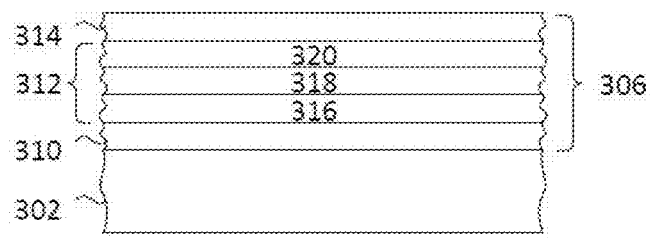
Figure 3C:
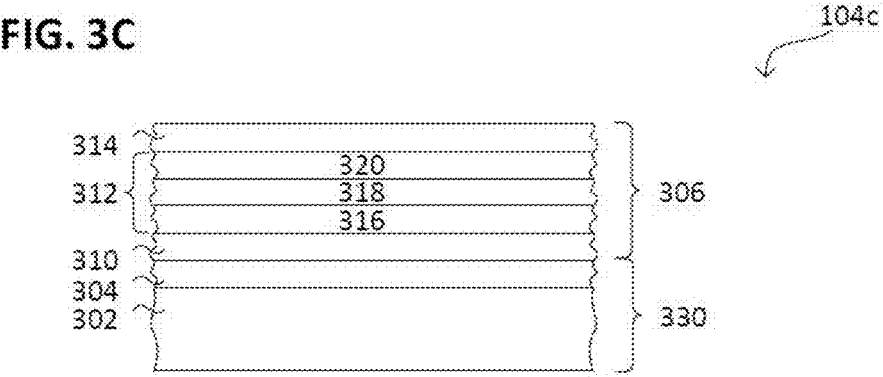

FIG. 3A to FIG. 3C illustrate in each case a schematic cross-sectional view or side view of a light source in accordance with various embodiments in a method in accordance with various embodiments for producing a light source.

The features of the light sources 104a, 104b, 104c illustrated in FIG. 3A to FIG. 3C can be understood as an alternative or in addition to the features of the light source 104 as described herein (cf. FIG. 1A to FIG. 1C, for example), and can be for example part of a lighting device as described herein (e.g. of the lighting device 100a, 200a, 500a or 600a). The light sources 104a, 104b, 104c can be formed in the form of an optoelectronic component, as described below.

FIG. 3A illustrates a sectional illustration or side view of a light source 104a in accordance with various embodiments.

Forming the light source 104a includes forming a first electrode 310, forming a functional layer structure 312 and forming a second electrode 314, which together are part of the light source 104a and are arranged on or above a substrate 302. The substrate 302 can be part of the carrier 102 (FIG. 4A), in which the cavity 102h is formed, e.g. in the form of a carrier element. Alternatively, the substrate 302 can be separate from the carrier 102 (cf. FIG. 5A), and can be arranged e.g. on or above the carrier 102, e.g. between the functional layer structure 312 and the carrier 102 or in such a way that the functional layer structure 312 is arranged between the substrate 302 and the carrier 102.

The functional layer structure 312 can be formed as an organic functional layer structure 312 or as an inorganic functional layer structure 312.

In accordance with various embodiments, the first electrode 310, the functional layer structure 312 and the second electrode 314 form a light emitting diode 306, e.g. an organic light emitting diode 306 or an inorganic light emitting diode 306, as described below and as illustrated in FIG. 3A.

The light emitting diode 306 is also referred to as a luminous thin-film component composed of semiconducting materials and is designed for generating electromagnetic radiation (e.g. light), e.g. if an electric current for operating the light source 104a flows through the functional layer structure 312 between the first electrode 310 and the second electrode 314. The electromagnetic radiation generated can be emitted at least through some layers and parts of the light source 104a and away from the light source 104a. In other words, the light source 104a is designed for converting electrical energy into electromagnetic radiation (e.g. light).

The first electrode 310 (also referred to as bottom electrode 310 or as bottom contact 310) and/or the second electrode 314 (also referred to as top electrode 314 or as top contact 314) are formed in such a way that they include at least one layer. The first electrode 310 and/or the second electrode 314 can be formed in such a way that they have a layer thickness in a range of approximately 1 nm to approximately 50 nm, for example of less than or equal to approximately 40 nm, for example of less than or equal to approximately 20 nm, for example of less than or equal to approximately 10 nm.

The first electrode 310 is formed from an electrically conductive substance. The first electrode 310 is formed as an anode, that is to say as a hole-injecting electrode. The first electrode 310 is formed in such a way that it includes a first electrical contact pad (not illustrated), wherein a first electrical potential (provided by an energy source (not illustrated), for example a current source or a voltage source) can be applied to the first electrical contact pad. Alternatively, the first electrode 310 can be electrically conductively connected to a first electrical contact pad for the purpose of applying a first potential. The first electrical contact pad (also referred to as contacting surface) can be designed for electrically conductive contacting, e.g. for bonding or soldering. The first electrical potential can be the ground potential or some other predefined reference potential.

The functional layer structure 312 is formed on or above the first electrode 310. If the light source 104a is formed as an inorganic optoelectronic component, the functional layer structure 312 may include a p-n junction layer 318, for example including or composed of a semiconductor, such as e.g. a group IV semiconductor, a group III-V compound semiconductor or a group II-VI compound semiconductor. If the light source 104a is formed as an organic optoelectronic component, the functional layer structure 312 may include an emitter layer 318, for example including or composed of fluorescent and/or phosphorescent emitter materials.

The second electrode 314 is formed on or above the functional layer structure 312. The second electrode 314 is formed as a cathode, that is to say as an electron-injecting electrode. The second electrode 314 includes a second electrical terminal (in other words a second electrical contact pad), for applying a second electrical potential (which is different than the first electrical potential), provided by the energy source. Alternatively, the second electrode 314 can be electrically conductively connected to a second electrical contact pad for the purpose of applying a second potential. The second electrical contact pad can be designed for electrically conductive contacting, e.g. for bonding or soldering. The second electrical potential can be a potential different than the first electrical potential.

Alternatively or additionally, an electrical contact pad may include a plurality of electrical contact pads.

For the purpose of operating the light source 104a, i.e. if the light source 104a is intended to generate electromagnetic radiation (i.e. in an on state of the lighting device 300a), the first electrical potential and the second electrical potential can be generated by the energy source (e.g. a current source, e.g. a power supply unit or a driver circuit) and can be applied to the first electrical contact pad and the second electrical contact pad. The first electrical potential and the second electrical potential can bring about an electric current that flows through the functional layer structure 312 and excites the latter for generating and emitting electromagnetic radiation.

The second electrical potential has a value such that the difference with respect to the first electrical potential (in other words the operating voltage of the lighting device 300a, that is applied to the light source 104a) has a value in a range of approximately 1.5 V to approximately 20 V, for example a value in a range of approximately 2.5 V to approximately 15 V, for example a value in a range of approximately 3 V to approximately 12 V. The energy source can be designed for generating this operating voltage.

The substrate 302 can be provided as an integral substrate 302. The substrate 302 can be in the form of a monolithic substrate or a substrate constructed integrally from a plurality of layers, wherein the plurality of layers are fixedly connected to one another.

The substrate 302 can have various shapes. By way of example, the substrate 302 can be formed as a film (e.g. a metallic film or a plastics film), as a plate (e.g. a plastics plate, a glass plate or a metal plate). Alternatively or additionally, the substrate 302 can be formed such that it is prism-shaped, trapezoidal, cylindrical, or pyramidal. Alternatively or additionally, the substrate 302 can have at least one flat or at least one curved surface, e.g. a main processing surface on a main processing side of the substrate 302, on or above which the layers of the light source 104a are formed.

The substrate 302 may include or be formed from an electrically insulating substance. An electrically insulating substance may include one or a plurality of the following materials: an electrically insulating oxide, e.g. glass or quartz, a plastic, a composite material (e.g. a laminate composed of a plurality of films or a fiber-plastic composite).

A plastic includes or is formed from one or a plurality of polyolefins (for example high or low density polyethylene (PE) or polypropylene (PP)). Furthermore, the plastic may include or be formed from polyvinyl chloride (PVC), polystyrene (PS), polyester and/or polycarbonate (PC), polyethylene terephthalate (PET), polyethersulfone (PES) and/or polyethylene naphthalate (PEN). Alternatively or additionally, the substrate 302 can be formed in such a way that it includes one or a plurality of the substances mentioned above.

Alternatively or additionally, the substrate 302 may include a semiconductor or any other suitable material.

Alternatively or additionally, the substrate 302 may include or be formed from an electrically conductive substance, e.g. an electrically conductive polymer, a metal, a transition metal oxide or an electrically conductive transparent oxide.

In accordance with various embodiments, the substrate 302 can be electrically conductive. For this purpose, the substrate 302 may include or be formed from an electrically conductive substance or include or be formed from an electrically insulating substance that is coated with an electrically conductive substance. The electrically conductive coating may include or be formed from an electrically conductive substance, e.g. metal (i.e. in the form of a metal coating).

By way of example, a substrate 302 including or formed from a metal can be formed as a metal film or a metal-coated film. The substrate 302 can be designed in such a way that it conducts electric current during the operation of the light source 104a.

If the substrate 302 is electrically conductive, then the substrate 302 can serve as an electrode, e.g. as a bottom electrode 310, of the light emitting diode 306. Alternatively or additionally, the substrate 302 can be formed from a substance having a high thermal conductivity or may include such a substance.

Alternatively or additionally, the substrate 302 can be formed as light-transmissive, e.g. opaque, translucent or even transparent, with respect to at least one wavelength range of the electromagnetic radiation, for example in at least one range of visible light, for example in a wavelength range of approximately 380 nm to 780 nm.

If the substrate 302 is formed as light-transmissive, the substrate 302 can be arranged between the functional layer structure 312 and the carrier 102, such that generated light 412e is emitted through the substrate 302. In this case, the light source 104a is formed as a rear side emissive light source 104a, as a so-called bottom emitter, and the surface of the substrate 302 that faces away from the functional layer structure 312 can form the light emission surface 104e of the light source 104. If a first electrode 310 is used for a bottom emitter, it can likewise be formed as light-transmissive.

If the substrate 302 is formed as light-nontransmissive, the second electrode 314 can be formed as light-transmissive. The functional layer structure 312 can then be arranged between the substrate 302 and the carrier 102, such that generated light 412e is emitted through the second electrode 314. In this case, the light source 104a is formed as a front side emissive light source 104a, as a so-called top emitter, and the surface of the second electrode 314 that faces away from the functional layer structure 312 can form the light emission surface 104e of the light source 104.

Alternatively or additionally, the substrate 302 can be designed as light-reflecting, e.g. can be a part of a mirror structure or form the same. What can thus be achieved is that the luminous efficiency can be increased.

In accordance with various embodiments, the light source 104a can be formed as a transparent component, i.e. as a combination of top emitter and bottom emitter. In the case of a transparent component, both the first electrode 310 and the second electrode 310 can be formed as transparent.

The first electrode 310 can be formed from or include a metal. In the case where the first electrode 310 includes or is formed from a metal, the first electrode 310 can have a layer thickness in a range of approximately 10 nm to approximately 25 nm, for example in a range of approximately 10 nm to approximately 18 nm, for example in a range of approximately 15 nm to approximately 18 nm.

In order to form the first electrode 310 such that it is light-transmissive, the first electrode 310 may include or be formed from a transparent conductive oxide (TCO). Transparent conductive oxides are transparent conductive substances, for example metal oxides, such as, for example, zinc oxide, tin oxide, cadmium oxide, titanium oxide, indium oxide, or indium tin oxide (ITO). Alongside binary metal-oxygen compounds, such as, for example, ZnO, $SnO_2$, or $In_2O_3$, ternary metal-oxygen compounds, such as, for example, AlZnO, $Zn_2SnO_4$, $CdSnO_3$, $ZnSnO_3$, $MgIn_2O_4$, $GaInO_3$, $Zn_2In_2O_5$ or $In_4Sn_3O_{12}$, or mixtures of different transparent conductive oxides also belong to the group of TCOs. Furthermore, the TCOs do not necessarily correspond to a stoichiometric composition and can furthermore be p-doped or n-doped, or hole-conducting (p-TCO) or electron-conducting (n-TCO).

Furthermore, for the case where the first electrode 310 includes or is formed from a transparent conductive oxide (TCO), the first electrode 310 can have for example a layer thickness in a range of approximately 50 nm to approximately 500 nm, for example a layer thickness in a range of approximately 75 nm to approximately 250 nm, for example a layer thickness in a range of approximately 100 nm to approximately 150 nm.

Alternatively or additionally, the first electrode 310 may include or be formed from an electrically conductive polymer.

Alternatively or additionally, the first electrode 310 can be formed by a layer stack or a combination of the layers described above. One example is a silver layer applied on or above an indium tin oxide layer (ITO) (Ag on ITO) or ITO-Ag-ITO multilayers. Alternatively or additionally, the first electrode 310 may include or be formed from a layer stack of a plurality of layers of the same metal or of different metals and/or of the same TCO or of different TCOs.

The second electrode 314 can be formed as an anode, that is to say as a hole-injecting electrode. The second electrode 314 can be formed in accordance with one or a plurality of the above-described embodiments of the first electrode 310, e.g. identically to, similarly to or differently than the first electrode 310.

FIG. 3B illustrates a schematic cross-sectional view of a light source 104b in accordance with various embodiments. A description is given below of the layer construction for the light source 104b which is formed in the form of an organic optoelectronic component, i.e. includes an optically functional layer structure 312 formed from organic layers. To put it another way, the light source 104b can be formed as an organic light source 104. The light source 104b illustrated in FIG. 3B can for example largely correspond to the light source 104a illustrated in FIG. 3a if it is formed as an organic optoelectronic component.

Forming the organic functional layer structure 312 may include forming one or a plurality of emitter layers 318. A plurality of emitter layers 318 can be formed for example identically to one another or differently than one another.

Alternatively or additionally, the emitter layer 118 may include or be formed from organic polymers, organic oligomers, organic monomers, organic small, non-polymeric molecules ("small molecules") or a combination of these materials.

Alternatively or additionally, the emitter materials can be embedded in a matrix material, e.g. a plastic, in a suitable manner. It should be pointed out that other suitable emitter materials can likewise be provided. Alternatively or additionally, the emitter materials of the emitter layer(s) 318 of the light source 104b can be chosen for example such that the light source 104b emits white light. Alternatively or additionally, the emitter layer(s) 318 includes/include a plurality of emitter materials emitting in different colors (for example blue and yellow or blue, green and red); alternatively, the emitter layer(s) 318 is/are also constructed from a plurality of partial layers, such as a blue fluorescent emitter layer 318 or blue phosphorescent emitter layer 318, a green phosphorescent emitter layer 318 and/or a red phosphorescent emitter layer 318. The mixing of the different colors can result in the emission of light 412e having a white color impression. Alternatively, provision is made for arranging a converter material in the beam path (i.e. in the light propagation region) of the primary emission generated by these layers, which converter material at least partly absorbs the primary radiation and emits a secondary radiation having a different wavelength, such that a white color impression results from a (not yet white) primary radiation as a result of the combination of primary radiation and secondary radiation.

The first electrode 310 is formed on or above the substrate 302. A hole injection layer is formed (not shown) on or above the first electrode 310. A hole transport layer 316 (also referred to as a hole conducting layer 316) is formed on or above the hole injection layer. Furthermore, the emitter layer 318 is formed on or above the hole transport layer 316. An electron transport layer 320 (also referred to as electron conducting layer 320) is formed on or above the emitter layer 318. An electron injection layer (not shown) is formed on or above the electron transport layer 320. The second electrode 314 is formed on or above the electron injection layer.

The layer sequence of the light source 104b is not restricted to the embodiments described above; by way of example, one or a plurality of the layers mentioned above can be omitted. Furthermore, alternatively, the layer sequence can be formed in the opposite order. Furthermore, two layers can be formed as a layer.

The hole injection layer can be formed in such a way that it has a layer thickness in a range of approximately 10 nm to approximately 1000 nm, for example in a range of approximately 30 nm to approximately 300 nm, for example in a range of approximately 50 nm to approximately 200 nm.

Alternatively or additionally, the light source 104b may include a plurality of hole injection layers.

The hole transport layer 316 can be formed in such a way that it has a layer thickness in a range of approximately 5 nm to approximately 50 nm, for example in a range of approximately 10 nm to approximately 30 nm, for example approximately 20 nm.

Alternatively or additionally, the light source 104b may include a plurality of hole transport layers 316.

The electron transport layer 320 can be formed in such a way that it has a layer thickness in a range of approximately 5 nm to approximately 50 nm, for example in a range of approximately 10 nm to approximately 30 nm, for example approximately 20 nm.

Alternatively or additionally, the light source 104b may include a plurality of electron transport layers 320.

The electron injection layer can be formed in such a way that it has a layer thickness in a range of approximately 5 nm to approximately 200 nm, for example in a range of approximately 20 nm to approximately 50 nm, for example approximately 30 nm.

Alternatively or additionally, the light source 104b may include a plurality of electron injection layers.

Alternatively or additionally, the light source 104b can be formed in such a way that it includes two or more organic functional layer structures 312, e.g. a first organic functional layer structure 312 (also referred to as first organic functional layer structure units) and a second organic functional layer structure 312 (also referred to as second organic functional layer structure units).

The second organic functional layer structure unit can be formed above or alongside the first functional layer structure unit. An intermediate layer structure (not shown) can be formed between the organic functional layer structure units.

The intermediate layer structure can be formed as an intermediate electrode, for example in accordance with one of the configurations of the first electrode 310. An intermediate electrode can be electrically connected to an external energy source. The external energy source can provide a third electrical potential at the intermediate electrode. However, the intermediate electrode can also have no external electrical connection, for example by virtue of the intermediate electrode having a floating electrical potential.

Alternatively or additionally, the intermediate layer structure can be formed as a charge generation layer (CGL) structure. A charge generation layer structure includes or is formed from one or a plurality of electron-conducting charge generation layer(s) and one or a plurality of hole-conducting charge generation layer(s). The electron-conducting charge generation layer(s) and the hole-conducting charge generation layer(s) are formed in each case from an intrinsically conducting substance or a dopant in a matrix. The charge generation layer structure should be formed with respect to the energy levels of the electron-conducting charge generation layer(s) and the hole-conducting charge generation layer(s) in such a way that electron and hole can be separated at the interface between an electron-conducting charge generation layer and a hole-conducting charge generation layer. Optionally, the charge generation layer structure can have a diffusion barrier between adjacent layers.

Alternatively or additionally, the abovementioned layers can be formed as mixtures of two or more of the abovementioned layers.

It should be pointed out that, alternatively or additionally, one or a plurality of the abovementioned layers arranged between the first electrode 310 and the second electrode 314 are optional.

By way of example, the organic functional layer structure 312 can be formed as a stack of two, three or four OLED units arranged directly one above the other. In this case, the organic functional layer structure 312 has a layer thickness of a maximum of approximately 3 µm.

In addition, the light source 104b can be formed in such a way that it optionally includes further organic functional layers (which can consist of organic functional materials), for example arranged on or above the one or the plurality of emitter layers 318 or on or above the electron transport layer(s) 216, which serve to further improve the functionality and thus the efficiency of the light source 104b.

FIG. 3C illustrates a schematic cross-sectional view or side view of a light source 104c in accordance with various embodiments, which for example largely corresponds to the embodiment illustrated in FIG. 3B. As an alternative to the layer sequence illustrated in FIG. 3B, the light source 104c may include the layer sequence illustrated in FIG. 3C, which layer sequence is described below.

A barrier layer 304 is arranged on or above the substrate 302 and between the substrate 302 and the light emitting diode 306. The substrate 302 and the barrier layer 304 form a hermetically impermeable substrate 302. The barrier layer 304 may include or be formed from one or a plurality of the following substances: aluminum oxide, zinc oxide, zirconium oxide, titanium oxide, hafnium oxide, tantalum oxide, lanthanum oxide, silicon oxide, silicon nitride, silicon oxynitride, indium tin oxide, indium zinc oxide, aluminum-doped zinc oxide, poly(p-phenylene terephthalamide), nylon 66, and mixtures and alloys thereof.

In accordance with various embodiments, the barrier layer 304 can be formed for example from an electrically insulating substance (i.e. as an electrical insulator, as a so-called insulation layer).

The barrier layer 304 can be formed in such a way that it has a layer thickness of approximately 0.1 nm (one atomic layer) to approximately 1000 nm, for example a layer thickness of approximately 10 nm to approximately 100 nm in accordance with one configuration, for example approximately 40 nm in accordance with one configuration.

The barrier layer 304 can be formed by means of vacuum processing, liquid phase processing or alternatively by means of other suitable deposition methods.

Alternatively or additionally, the barrier layer 304 can be formed in such a way that it includes a plurality of partial layers. In the case of a barrier layer 304 including a plurality of partial layers, all the partial layers can be formed e.g. by means of an atomic layer deposition method. A layer sequence including only ALD layers can also be referred to as a "nanolaminate".

Alternatively or additionally, the barrier layer 304 is formed in such a way that it includes one or a plurality of optically high refractive index materials, for example one or a plurality of material(s) having a high refractive index, for example having a refractive index of at least 2.

Alternatively or additionally, the abovementioned layers are formed as mixtures of two or more of the abovementioned layers.

Alternatively or additionally, one of the light sources 104, 104a, 104b, 104c described herein may include a color filter and/or a converter structure, which can be arranged and/or formed above the substrate 302. By means of targeted variation of a surface in the case of planar substrates 302 (variation of the bottom contact 310 or single-sided coating or application of a color filter or of a converter), it is possible to achieve a targeted change in the emission in one direction, independently of the emission in the other direction. This applies to nontransparent and (semi) transparent embodiments.

Figure 4B:
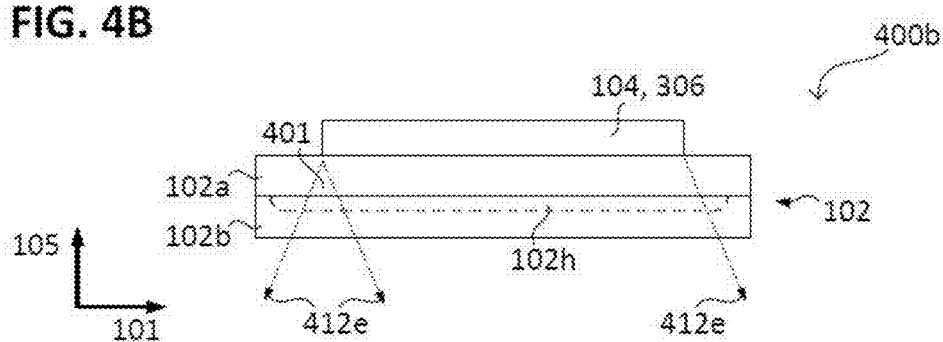

FIG. 4A and FIG. 4B illustrate in each case a schematic cross-sectional view or side view of a lighting device in accordance with various embodiments.

Figure 4C:
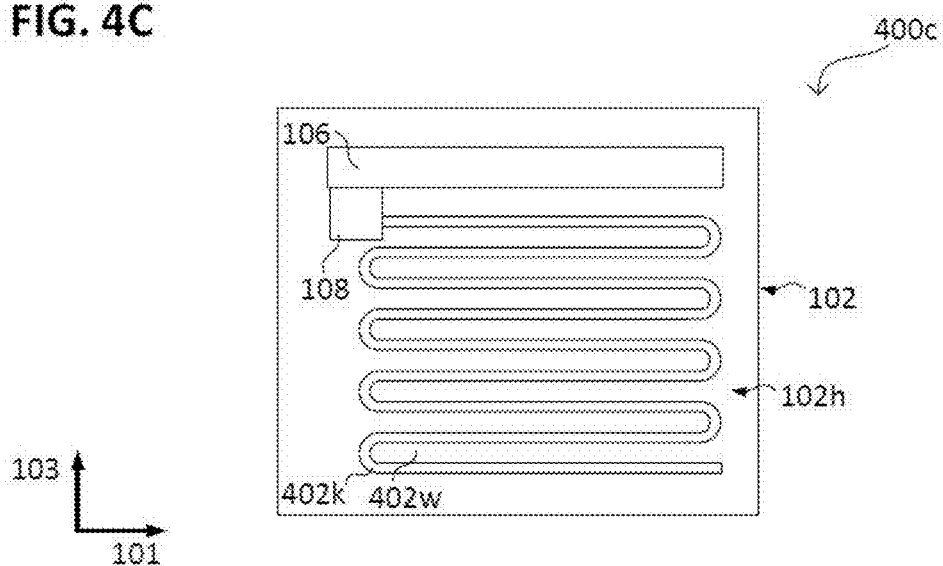
FIG. 4C shows a schematic cross-sectional view or plan view of a lighting device in accordance with various embodiments.

The features of the lighting devices 400a, 400b, 400c illustrated in FIG. 4A to FIG. 4C can be as an alternative or in addition to the features of a lighting device as described herein (e.g. of the lighting device 100a, 200a, 500a or 600a).

FIG. 4A illustrates a schematic cross-sectional view or side view of a lighting device 400a, wherein the carrier 102 includes a first carrier element 102a and a second carrier element 102b.

The first carrier element 102a and the second carrier element 102b can be designed in accordance with one of the above-described embodiments of the substrate 302, e.g. as a plate (i.e. plate-shaped) and/or light-transmissive.

A light source 104 can be arranged on the first carrier element 102a, as described above. Alternatively, the first carrier element 102a can serve as a substrate 302 for a light emitting diode 306, e.g. for an organic light emitting diode 306 (cf. for example FIG. 3A to FIG. 3C).

A respective cutout can be formed in the first carrier element 102a and in the second carrier element 102b, which cutouts form the cavity 102h when the first carrier element 102a and the second carrier element 102b are joined together, i.e. are brought into physical contact with one another. The first carrier element 102a and the second carrier element 102b can for example be fixed to one another, e.g. adhesively bonded to one another.

A fluid connection (not illustrated) can be formed for example as a groove in the first carrier element 102a and/or the second carrier element 102b.

FIG. 4B illustrates a schematic cross-sectional view or side view of a lighting device 400b, wherein the carrier 102 includes a first carrier element 102a and a second carrier element 102b.

In contrast to the lighting device 400a illustrated in FIG. 4A, the cutout can be formed only in one of the carrier elements, for example in the second carrier element 102b, as illustrated in FIG. 4B, or alternatively only in the first carrier element 102a (not illustrated).

This makes it possible for the respective carrier element in which no cutout is formed to be fabricated from a material in which a cutout is difficult to form, e.g. from glass.

FIG. 4C illustrates a schematic cross-sectional view or plan view of a lighting device 400c in accordance with various embodiments, wherein the cavity 102h is formed as a capillary 402k, i.e. as a very fine, elongated cavity 102h.

The capillary 402k can extend in a meandering fashion in the carrier 102, e.g. with a plurality of rectilinearly running sections which run parallel to one another and are connected at their ends in each case by a section running in a curved fashion, such that they jointly form a continuous channel 402k.

Alternatively or additionally, microwalls 402w can be extended in the cavity 102h, which microwalls divide the cavity 102h into a channel 402k running in a meandering fashion.

Analogously to the preceding description, the fluid reservoir 106 and the microfluid pump 108 can be arranged in the carrier 102.

Figure 5A:
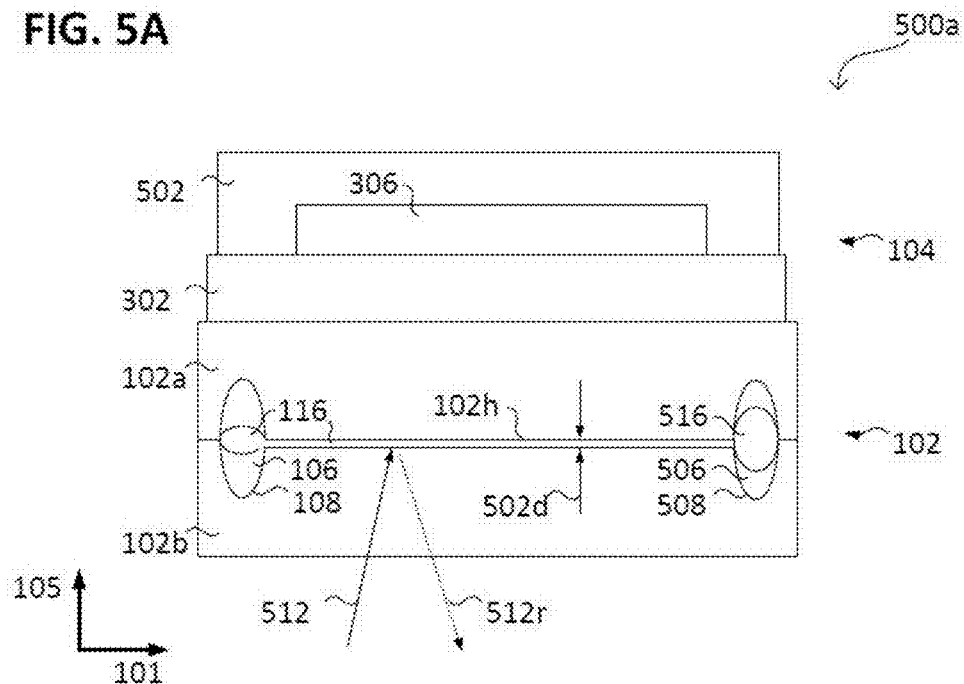
FIGS. 5A and 5B show in each case a schematic cross-sectional view or side view of a lighting device in accordance with various embodiments in a method for operating the lighting device in accordance with various embodiments.
Figure 5B:
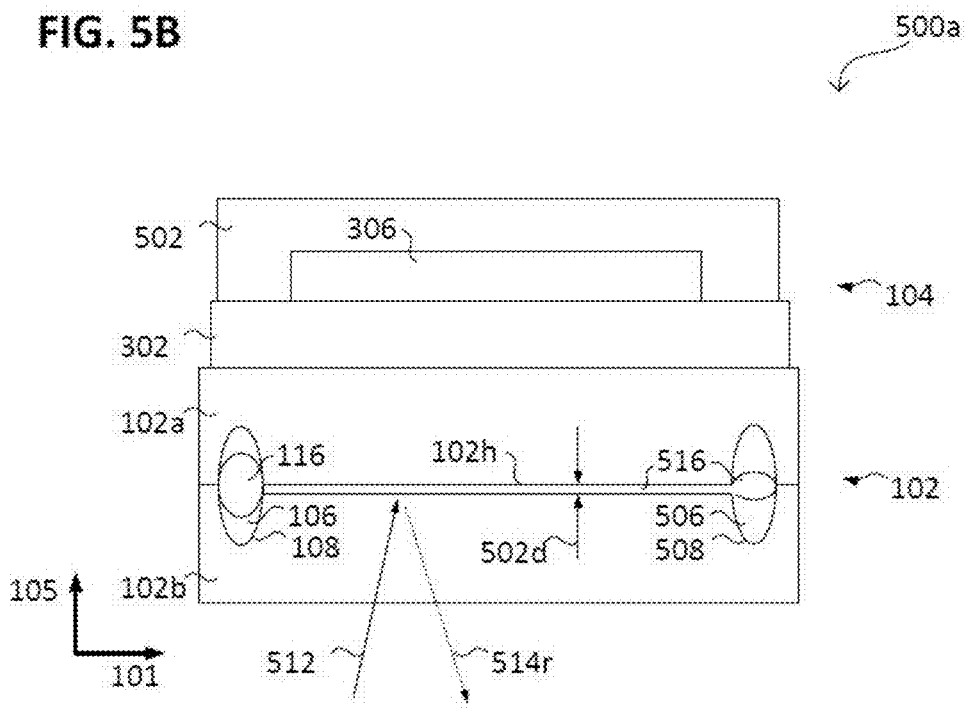

FIG. 5A and FIG. 5B illustrate in each case a schematic cross-sectional view or side view of a lighting device 500a in accordance with various embodiments in a method 100 (cf. FIG. 7) for operating the lighting device 500a (e.g. for generating and/or altering an OSA of the lighting device 500a) in accordance with various embodiments.

The features of the lighting device 500a illustrated in FIG. 5A and FIG. 5B can be as an alternative or in addition to the features of a lighting device as described herein (e.g. of the lighting device 100a, 200a, 400a, 400b, 400c or 600a).

FIG. 5A illustrates the lighting device 500a in accordance with various embodiments, which has a first OSA in accordance with various embodiments or by means of which a first OSA is generated.

In accordance with various embodiments, the light source 104 can have an encapsulation 502. The encapsulation 502 of the light source 104 increases the lifetime of the light source 104, for example. The encapsulation 502 can be formed on or above the light emitting diode 306.

Furthermore, the light source 104 in accordance with various embodiments may include a first contacting structure (not shown), e.g. one or a plurality of metalization layers, electrical lines, or the like, which can be arranged between the encapsulation 502 and the light emitting diode 306 and can be electrically conductively connected to the electrodes 310, 314 of the light source 104. The first contacting structure can furthermore be connected to the energy source (not shown) and make it possible to transfer electrical energy from the energy source to the light emitting diode 306, i.e. to supply the light emitting diode 306 with electrical energy.

Furthermore, the substrate 302 can be arranged on a first carrier element 102a. The first carrier element 102a and the second carrier element 102b joined together can form the carrier 102, in which a cavity 102h can be formed.

Furthermore, the light source 104 in accordance with various embodiments may include a first microfluid pump 108 and a second microfluid pump 508, which are connected to the cavity 102h. Furthermore, the light source 104 in accordance with various embodiments may include a first fluid reservoir 106 and a second fluid reservoir 506.

The first fluid reservoir 106 can be accommodated for example together with the first microfluid pump 108 in one cavity in the carrier 102. The second fluid reservoir 506 can be accommodated for example together with the second microfluid pump 508 in another cavity in the carrier 102.

By way of example, the first fluid reservoir 106 can be part of the first microfluid pump 108 and the second fluid reservoir 506 can be part of the second microfluid pump 508, as described above.

Furthermore, the light source 104 in accordance with various embodiments may include a second contacting structure (not shown), e.g. one or a plurality of metalization layers, electrical lines, or the like, which extends through the carrier 102 and electrically contacts the first microfluid pump 108 and/or the second microfluid pump 508.

The first contacting structure and the second contacting structure can each include a contact pad, which e.g. are arranged on the carrier 102 and are designed for contacting the first contacting structure and the second contacting structure, respectively, e.g. for electrical connection to an energy source and/or a controller.

Furthermore, the light source 104 in accordance with various embodiments may include a first fluid 116, which is at least partly received in the first fluid reservoir 106, and may include a second fluid 516, which is at least partly received in the second fluid reservoir 506.

In accordance with various embodiments, the light source 104 can be formed as a rear-side emissive light source 104. If the light source 104 is formed as a top emitter, e.g. with a substrate 302 in the form of a metal film, the microfluidic-optical assembly, i.e. the carrier 102, the fluid reservoirs 106, 506, the microfluid pumps 108, 508 and the cavity 102h, can correspondingly be arranged at the top side of the light source 104, i.e. on the side of the encapsulation 502.

In the lighting device 500a illustrated in FIG. 5A, the first fluid reservoir 106 is partly or completely emptied, that is to say that the first fluid 116 is partly or completely expelled from the first fluid reservoir 106. The first fluid 116 expelled from the first fluid reservoir 106 can be introduced into the cavity 102h (also referred to as interspace), that is to say that the cavity 102h is partly or completely filled with the first fluid 116.

Correspondingly, the second fluid 516 can be partly or completely introduced into the second fluid reservoir 506, e.g. the second fluid reservoir 506 can be completely filled with the second fluid 516.

By way of example, the cavity 102h can be completely filled with the first fluid 116 and can be free of the second fluid 516.

The cavity 102h can be shaped in such a way that the first fluid 116 forms a thin layer (also referred to as first fluid layer), which can be arranged below the light source 104, e.g. in the light propagation region of the light source 104. The first fluid layer can have a thickness 502d corresponding to the thickness 502d of the cavity 102h, as described above. In other words, the first fluid layer can be formed from the first fluid 116.

The first fluid layer can at least partly reflect 512r or return 512r externally generated light 512, e.g. daylight or light from some other light source outside the lighting device 500a. In this case, the color valence of the returned/reflected light 512r can be defined by the first fluid 116. In other words, the first fluid layer can convert part of the light 512 impinging on the lighting device 500a into returned light 512r and/or reflected light 512r having a first color valence, e.g. red.

The ratio of reflected light to returned light can increase for example with increasing roughness of a surface of the cavity 102h and/or of a surface of the carrier 102 through which the light 512 passes, and/or with an increasing quantity of particles in the first fluid 116. By way of example, a specularly reflective OSA can be achieved if the roughness of a surface of the cavity 102h and/or a surface of the carrier 102 is small, e.g. smaller than half the wavelength of the reflected light 512r.

In other words, a first OSA of the lighting device 500a can be generated by means of the first fluid layer.

FIG. 5B illustrates the lighting device 500a in accordance with various embodiments, which has a second OSA in accordance with various embodiments or by means of which a second OSA is generated.

The lighting device 500a illustrated in FIG. 5B substantially corresponds to the lighting device 500a illustrated in FIG. 5A, the OSA thereof being altered by the first fluid 116 being displaced from the cavity 102h.

For this purpose, the second fluid 516 can be shifted from the second fluid reservoir 506 into the cavity 102h. If turbulences are prevented in the first fluid 116 and the second fluid 516 or these are orthogonal to one another, a mixing of the first fluid 116 with the second fluid 516 can be avoided.

In the lighting device 500a illustrated in FIG. 5B, the second fluid reservoir 506 is partly or completely emptied, that is to say that the second fluid 516 is partly or completely expelled from the second fluid reservoir 506. The second fluid 516 expelled from the second fluid reservoir 506 can be introduced into the cavity 102h, that is to say that the cavity 102h is filled with the second fluid 516, e.g. completely.

Correspondingly, the first fluid 116 can be completely introduced into the first fluid reservoir 106, e.g. the first fluid reservoir 106 can be completely filled with the first fluid 116. That is to say that the cavity 102h can be free of the first fluid 116.

The cavity 102h can be shaped in such a way that the second fluid 516 can be arranged in the form of a thin layer (also referred to as second fluid layer) below the light source 104, e.g. in the light propagation region of the light source 104. The second fluid layer can have a thickness 502d corresponding to the thickness 502d of the first fluid layer.

The second fluid layer can at least partly reflect 514r or return 514r externally generated light 512. In this case, the color valence of the returned/reflected light 514r can be defined by the second fluid 516. In other words, the second fluid layer can convert part of the light 512 impinging on the lighting device 500a into returned light 514r and/or reflected light 514r having a second color valence, e.g. blue.

The ratio of returned light to reflected light can increase for example with increasing roughness of a surface of the cavity 102h and/or of a surface of the carrier 102 through which the light 512 passes, and/or with an increasing quantity of particles in the second fluid 116.

In other words, a second OSA of the lighting device 500a can be generated by means of the second fluid layer. That is to say that the OSA of the lighting device 500a can be altered from a first OSA into a second OSA. Generating and/or altering the OSA of the lighting device 500a can be regulated or controlled, e.g. by means of a controller.

As a result of the absence of turbulences and as a result of the small extent of the cavity 102h, the two fluids 116, 516 do not mix. This can be supported by the use of polar and non-polar, i.e. immiscible, fluids 116, 516.

Figure 6A:
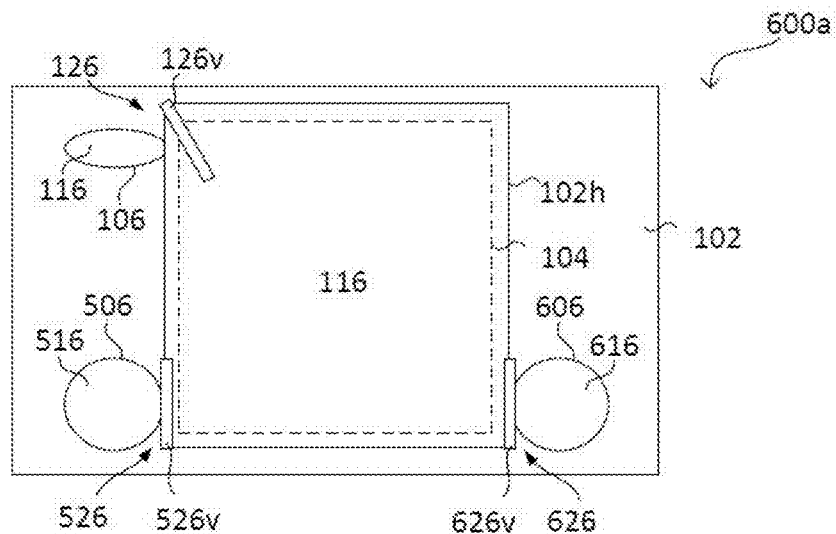
Figure 6B:
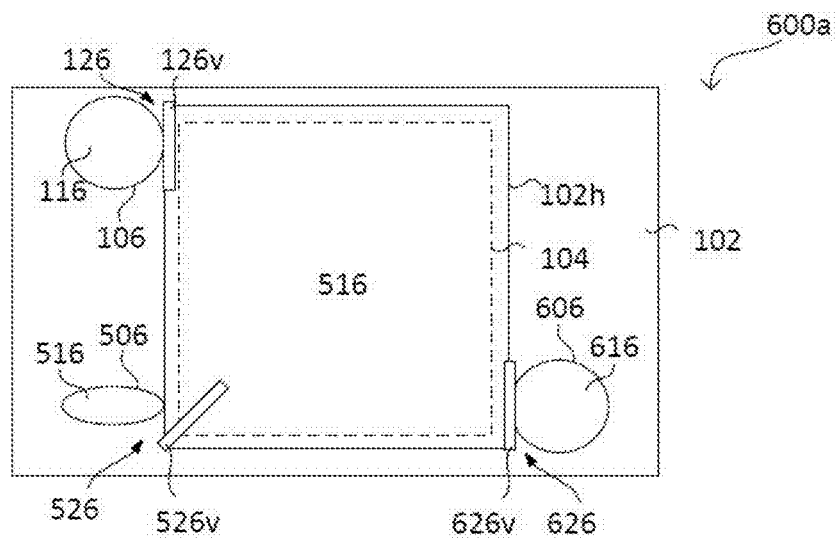

FIG. 6A to FIG. 6C illustrate in each case a schematic cross-sectional view or plan view of a lighting device 600a in accordance with various embodiments in a method 100 (cf. FIG. 7) for operating the lighting device 600a (e.g. for generating and/or altering an OSA of the lighting device 600a) in accordance with various embodiments.

The features of the lighting device 600a illustrated in FIG. 6A to FIG. 6C can be as an alternative or in addition to the features of a lighting device as described herein (e.g. of the lighting device 100a, 200a, 400a, 400b, 400c or 500a).

FIG. 6A illustrates a lighting device 600a in accordance with various embodiments, which has a first OSA in accordance with various embodiments.

In accordance with various embodiments, the lighting device 600a may include a light source 104, a carrier 102, in which a cavity 102h is formed, a first fluid reservoir 106, a second fluid reservoir 506, a first fluid 116, a second fluid 516 and one, two or three microfluid pumps (not illustrated). By way of example, the lighting device 600a may include an appropriately matching microfluid pump for each fluid reservoir 106, 506, 606.

Furthermore, the lighting device 600a in accordance with various embodiments may include a third fluid reservoir 606 and a third fluid 616, which can be designed analogously to the preceding description.

Furthermore, the lighting device 600a in accordance with various embodiments may include a first fluid connection 126, which connects the first fluid reservoir 106 to the cavity 102h. Analogously thereto, the lighting device 600a in accordance with various embodiments may include a second fluid connection 526, which connects the second fluid reservoir 506 to the cavity 102h and a third fluid connection 626, which connects the third fluid reservoir 606 to the cavity 102h.

Each of the fluid connections 126, 526, 626 can be formed in or through the carrier 102 in the form of a channel, for example by means of etching.

In accordance with various embodiments, the first fluid connection 126 may include a first microvalve 126v, the second fluid connection 526 may include a second microvalve 526v, and the third fluid connection 626 may include a third microvalve 626v.

As shown in the lighting device 600a illustrated in FIG. 6A, the first microvalve 126v can be opened and the first fluid 116 can be introduced into the cavity 102h. By way of example, the cavity 102h can be completely filled with the first fluid 116. The first fluid reservoir 106 can be dimensioned in such a way that it can be empty, i.e. substantially free of the first fluid 116, if the cavity 102h is completely filled with the first fluid 116.

The first fluid 116 can be formed for example as a transparent fluid 116. What is achieved as a result is that the light source 104 (e.g. an OLED) is completely visible. By way of example, the light 412e emitted by the light source 104 can pass substantially completely through the first fluid 116, e.g. can be only slightly scattered or absorbed (e.g. less than 10%). This enables a high luminous efficiency (also referred to as efficiency).

FIG. 6B illustrates the lighting device 600a in accordance with various embodiments, which has a second OSA in accordance with various embodiments.

As shown in the lighting device 600a illustrated in FIG. 6B, the second microvalve 526v can be opened and the second fluid 516 can be introduced into the cavity 102h. The first fluid 116 can be displaced completely from the cavity 102h upon the introduction of the second fluid 516 into said cavity.

By way of example, the cavity 102h can be completely filled with the second fluid 516. The second fluid reservoir 506 can be dimensioned in such a way that it can be empty, i.e. substantially free of the second fluid 516, if the cavity 102h is completely filled with the second fluid 516.

The second fluid 516 can be formed for example as a fluid 516 having a blue color valence. A blue color valence of the second OSA is achieved as a result.

Alternatively, the second fluid 516 can be designed in such a way that light 412e emitted by the light source 104 is altered by the second fluid 516, e.g. in terms of its color valence or intensity. As a result, the color valence or brightness of the lighting device 600a can be altered during operation.

FIG. 6C illustrates the lighting device 600a in accordance with various embodiments, which has a third OSA in accordance with various embodiments.

As shown in the lighting device 600a illustrated in FIG. 6C, the third microvalve 626v can be opened and the third fluid 616 can be introduced into the cavity 102h. The second fluid 516 can be completely displaced from the cavity 102h upon the introduction of the third fluid 616 into said cavity.

By way of example, the cavity 102h can be completely filled with the third fluid 616. The third fluid reservoir 606 can be dimensioned in such a way that it can be empty, i.e. substantially free of the third fluid 616, if the cavity 102h is completely filled with the third fluid 616.

The third fluid 616 can be formed for example as a light-reflecting fluid 616. A silvery or specularly reflective color valence of the third OSA is achieved as a result.

In accordance with various embodiments, generating a specularly reflective OSA of a lighting device 600a (e.g. of an OLED) can be achieved for example by introducing (e.g. pumping in) a specularly reflective fluid 616 into the cavity 102h. In the on state (i.e. during the operation of the lighting device 600a), a transparent fluid 116 having a matched refractive index can be situated in the cavity 102h, i.e. in front of the luminous area. If the lighting device 600a is switched off, then the specularly reflective fluid 616 can be pumped from the third fluid reservoir 606 in front of the light source 104 and partly or completely displace the transparent fluid 116 from the cavity 102h, such that the transparent fluid 116 can be received in the first fluid reservoir 106 in the switched-off state. This process, i.e. altering/setting and/or regulating/controlling the OSA, can be carried out by means of a controller (not shown) as described above. Analogously, the opening and closing of the microvalves 126v, 526v, 626v can be carried out by means of the controller.

Alternatively or additionally, at least two differently colored fluids 516, 616 (i.e. two fluids 516, 616 each having a different color valence) and a largely transparent fluid 116 can be used. A variably settable appearance of a light source 104, e.g. of a surface light source, can be achieved as a result. When the light source 104 is switched on, the transparent fluid 116 can be situated in the cavity 102h, i.e. in the region in front of the light source 104. The two colored fluids 516, 616 are situated in the respective fluid reservoirs 506, 606. If the light source 104 is switched off, then the desired colored fluid 516, 616 can be pumped into the cavity 102, i.e. in front of the light emission surface 104e (also referred to as luminous area) and can displace the transparent fluid 116 into the first fluid reservoir 106. The microvalves 526v, 626v make it possible to choose between the differently colored fluids 516, 616, depending on what color valence is intended to be achieved for the OSA.

Alternatively or additionally, the first fluid 116 may include scattering particles. If it is introduced into the cavity 102h in the switched-on state, the internal coupling-out can be improved and/or a Lambertian emission profile can be achieved, e.g. set.

Figure 7:
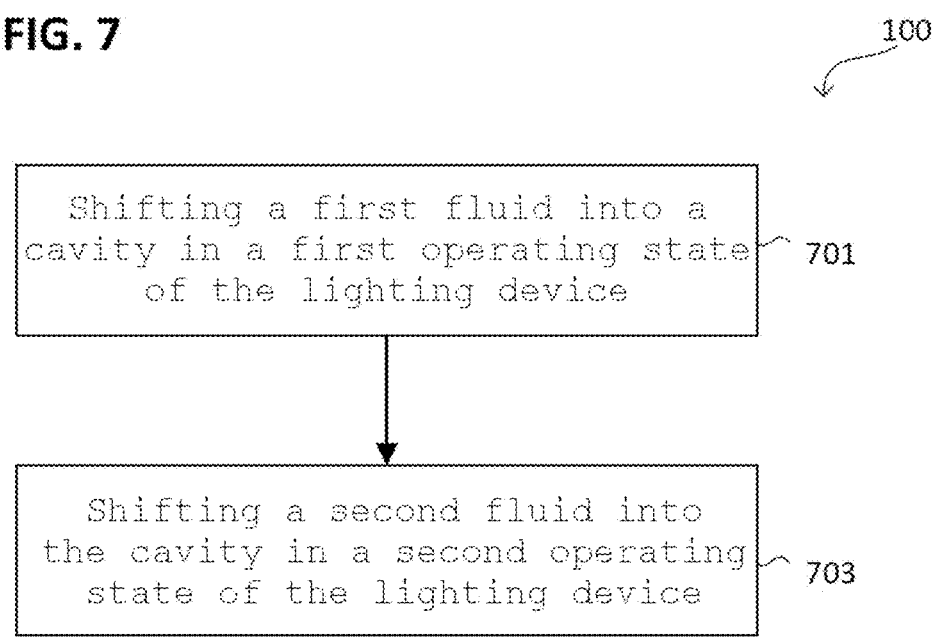
FIG. 7 shows a schematic flow diagram in a method for operating a lighting device in accordance with various embodiments.

FIG. 7 illustrates a schematic flow diagram in a method 100 for operating a lighting device (for example one of the lighting devices 100c, 200a, 400a, 500a, 600a) in accordance with various embodiments.

The method 100 includes in 701 shifting a first fluid 116 into a cavity 102h, wherein shifting the first fluid 116 is carried out in a first operating state of the lighting device. In the first operating state, a light source 104, 104a, 104b, 104c of the lighting device can emit a first light having a first color valence and a first intensity through the first fluid 116 (for example, the first fluid 116 is light-transmissive), such that the appearance of the lighting device is defined by the first light. The first operating state can be an on state of the lighting device.

Furthermore, the method 100 includes in 703 shifting a second fluid 516 into the cavity 102h, wherein shifting the second fluid 516 is carried out in a second operating state of the lighting device. In this case, the first fluid 116 can be displaced from the cavity 102h, such that the latter is freed of the first fluid 116. Shifting the first fluid 116 and/or the second fluid 516 can be carried out by means of a microfluid pump 108, e.g. reversibly.

In the second operating state, the light source 104, 104a, 104b, 104c of the lighting device can emit for example a second light having a second color valence and a second intensity different than the first light, e.g. different than the first color valence and/or different than the first intensity, e.g. no light if the second operating state is an off state of the lighting device.

Furthermore, the second fluid 516 can be light-nontransmissive and can be designed for reflecting or returning light impinging on the second fluid 516, for the purpose of generating a third light having a third color valence and a third intensity. The third light can propagate in a direction away from the second fluid 516 (or from the lighting device), such that the appearance of the lighting device is defined by the second light.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting device comprising:
   a carrier, in which a laterally extended cavity is formed;
   a light source arranged alongside the cavity and serving for generating light that propagates from the light source through the cavity;
   a fluid reservoir for receiving a fluid; and
   a microfluid pump, which is configured for shifting the fluid received in the fluid reservoir between the fluid reservoir and the cavity;
   wherein the microfluid pump is configured to shift the fluid depending on an operating state of the light source.

2. The lighting device of claim 1, wherein the microfluid pump is arranged in the carrier.

3. The lighting device of claim 1, wherein the fluid reservoir is formed as a cavity in the carrier.

4. The lighting device of claim 1, wherein the light source comprises a planar organic light emitting diode and an encapsulation covering the organic light emitting diode.

5. The lighting device of claim 1, wherein the cavity has a cross-sectional area greater than a cross-sectional area of the light source, and an extent of the cavity transversely with respect to the cross-sectional area of the cavity is in a range of approximately 0.1 µm to approximately 500 µm.

6. The lighting device of claim 1, wherein the cavity is formed as a capillary extended in a meandering fashion in the carrier.

7. The lighting device of claim 1, further comprising: the fluid, wherein the fluid comprises scattering particles or a conversion material, or wherein the fluid is formed as light-reflecting.

8. The lighting device of claim 1, wherein the operating state of the light source is defined by an operating voltage of the light source.

9. The lighting device of claim 1, further comprising: a further fluid reservoir for receiving a further fluid, wherein the further fluid is displaced from the cavity by the fluid, when the fluid is shifted into the cavity.

10. The lighting device of claim 9, further comprising: a further microfluid pump, which is configured for shifting the further fluid between the further fluid reservoir and the cavity.

11. The lighting device of claim 9, wherein the cavity is configured for a laminar flow such that upon shifting the fluid and the further fluid do not mix.

12. The lighting device of claim 9, further comprising: the further fluid, wherein the fluid and the further fluid are set up orthogonally with respect to one another.

13. The lighting device of claim 1, wherein the operating state of the light source comprises an on-state of the light source and an off-state of the light source.

14. The lighting device of claim 13, wherein the fluid allows a greater reflectivity of the lighting device in the off-state than in the on-state.

15. The lighting device of claim 1, wherein the microfluid pump is configured for initiating the shifting of the fluid when the operation state of the light source is changed.

16. The lighting device of claim 1, further comprising a controller, wherein the controller is configured for determining the operating state of the light source.

17. The lighting device of claim 1, wherein the microfluid pump is configured for changing light reflected, polarized or returned by the lighting device depending on the operating state of the light source by the shifting of the fluid.

18. The lighting device of claim 1, further comprising: the fluid, wherein the fluid comprises a light-reflecting fluid or a polarizing fluid.

19. A method for operating a lighting device, the method comprising:
   shifting a first fluid into a cavity of the lighting device in a first operating state of a light source; and
   shifting a second fluid into the cavity in a second operating state of the light source;
   wherein shifting at least one of the first fluid or the second fluid is carried out by means of a microfluid pump depending on an operating state of the light source.

20. The method of claim 19, wherein the first fluid or the second fluid cause light to be reflected, polarized or returned by the lighting device; wherein the light reflected, polarized or returned by the lighting device is regulated or controlled by the shifting of the first fluid or the second fluid.

* * * * *